United States Patent
Nakamura et al.

(10) Patent No.: US 8,600,673 B2
(45) Date of Patent: Dec. 3, 2013

(54) DRIVING ASSISTANCE APPARATUS

(75) Inventors: Masaki Nakamura, Okazaki (JP);
Naoto Miura, Nagoya (JP); Kiyokazu Okada, Miyoshi (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 647 days.

(21) Appl. No.: 12/451,098

(22) PCT Filed: May 29, 2008

(86) PCT No.: PCT/JP2008/060327
§ 371 (c)(1),
(2), (4) Date: Jul. 23, 2010

(87) PCT Pub. No.: WO2008/146949
PCT Pub. Date: Dec. 4, 2008

(65) Prior Publication Data
US 2010/0299000 A1 Nov. 25, 2010

(30) Foreign Application Priority Data
May 31, 2007 (JP) ................................. 2007-144708

(51) Int. Cl.
*G01S 13/88* (2006.01)
(52) U.S. Cl.
USPC ................. 701/514; 701/23; 701/24; 701/25; 701/467; 701/468; 701/469
(58) Field of Classification Search
USPC ............................... 701/23–25, 467–469, 514
See application file for complete search history.

(56) References Cited

U.S. PATENT DOCUMENTS

| 6,032,098 A * | 2/2000 | Takahashi et al. ............... 701/23 |
| 6,560,529 B1 * | 5/2003 | Janssen ......................... 701/469 |
| 2005/0128063 A1 | 6/2005 | Isaji et al. |
| 2009/0088978 A1 * | 4/2009 | Ishikawa et al. ............... 701/223 |

FOREIGN PATENT DOCUMENTS

| DE | 103 54 650 A1 | 6/2005 |
| DE | 11 2006 001 703 T5 | 6/2008 |
| JP | A-2003-035541 | 2/2003 |
| JP | A-2003-252148 | 9/2003 |

(Continued)

OTHER PUBLICATIONS

Japanese Patent Office, Notification of Reason for Rejection mailed Mar. 15, 2011 in Japanese Patent Application No. 2007-144708 w/Partial English-language Translation.

*Primary Examiner* — John Q Nguyen
*Assistant Examiner* — Jordan S Fei
(74) *Attorney, Agent, or Firm* — Oliff & Berridge, PLC

(57) ABSTRACT

A driving assistance apparatus is configured such that, in a case in which determination has been made there is a road marking within a predetermined range from a vehicle, the road marking is detected based upon an image acquired by a rear-side camera. In a case in which there is a single control target solely associated with the road marking thus detected, or in a case in which there are multiple control targets associated with the road marking, and the difference in the marking-target distance is equal to or greater than a driving control threshold distance, the target-vehicle distance, which is the distance between the vehicle and the control target that is a target for guidance and vehicle control, is calculated. The driving assistance apparatus performs guidance and vehicle control according to the control target based upon the target-vehicle distance thus calculated.

6 Claims, 15 Drawing Sheets

(56) References Cited

FOREIGN PATENT DOCUMENTS

| JP | A-2004-086363 | 3/2004 |
| JP | A-2005-173917 | 6/2005 |
| JP | A-2006-189325 | 7/2006 |
| JP | A-2006-209511 | 8/2006 |
| JP | A-2007-066305 | 3/2007 |
| WO | WO 2006/080547 A1 | 8/2006 |
| WO | WO 2007/018145 A1 | 2/2007 |

* cited by examiner

FIG. 3

ROAD MARKING DB 42

| COORDINATES (POSITION) | TYPE | CONTROL TARGET | DISTANCE ALONG ROAD BETWEEN ROAD MARKING AND CONTROL TARGET (MARKINGTARGET DISTANCE) |
|---|---|---|---|
| (x1,y1) | PEDESTRIAN CROSSING AHEAD | STOP LINE | 60m |
| (x2,y2) | ARROW | CORNER | 54m |
| (x3,y3) | MAXIMUM SPEED (40) | STOP LINE | 112m |
| | | STOP LINE | 72m |
| (x4,y4) | CHARACTER STRING | STOP LINE | 82m |
| | | STOP LINE | 85m |
| (x5,y5) | PEDESTRIAN CROSSING | INTERSECTION | 108m |
| ... | ... | ... | ... |

FIG. 4

LIST OF VEHICLE CONTROL AND GUIDANCE PERFORMED FOR CONTROL TARGET ACCORDING TO CONTROL LEVEL

| REQUIRED DECELERATION FOR CONTROL TARGET | CONTROL LEVEL | CONTENT OF CONTROL AND GUIDANCE |
|---|---|---|
| G1<0.05G | UNNECESSARY | PERFORM NO OPERATION |
| 0.05G≦G1<0.05G | LOW | PERFORM OPERATION AT INFORMATION SERVICE LEVEL |
| 0.1G≦G1<0.3G | MIDDLE | PERFORM OPERATION AT REMINDER LEVEL |
| 0.2G≦G1 | HIGH | PERFORM OPERATION AT SUPPORT/INTERVENTION LEVEL |

FIG. 8A
FIG. 8B
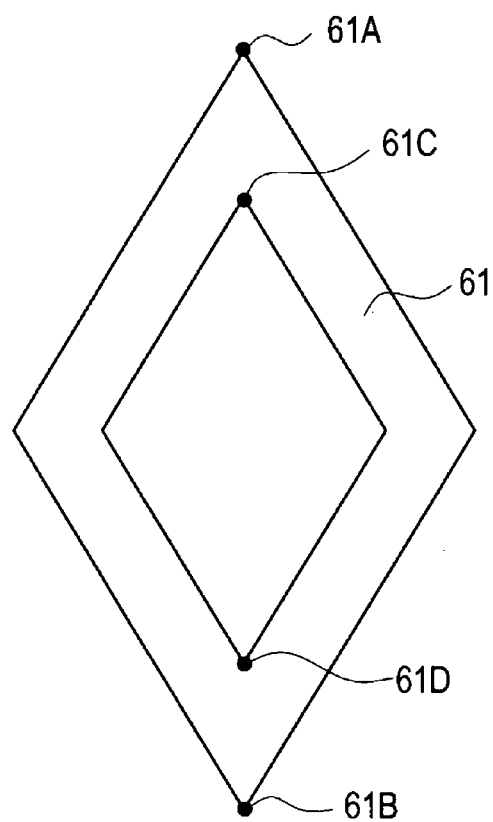
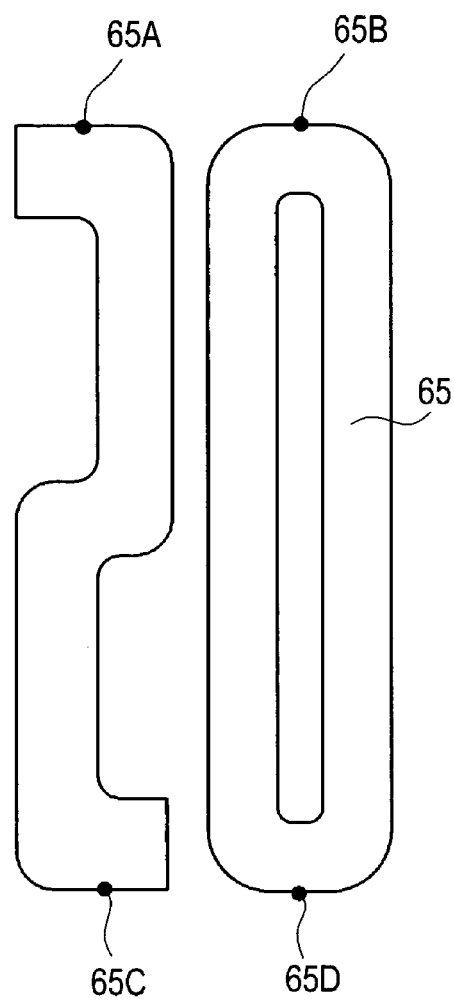

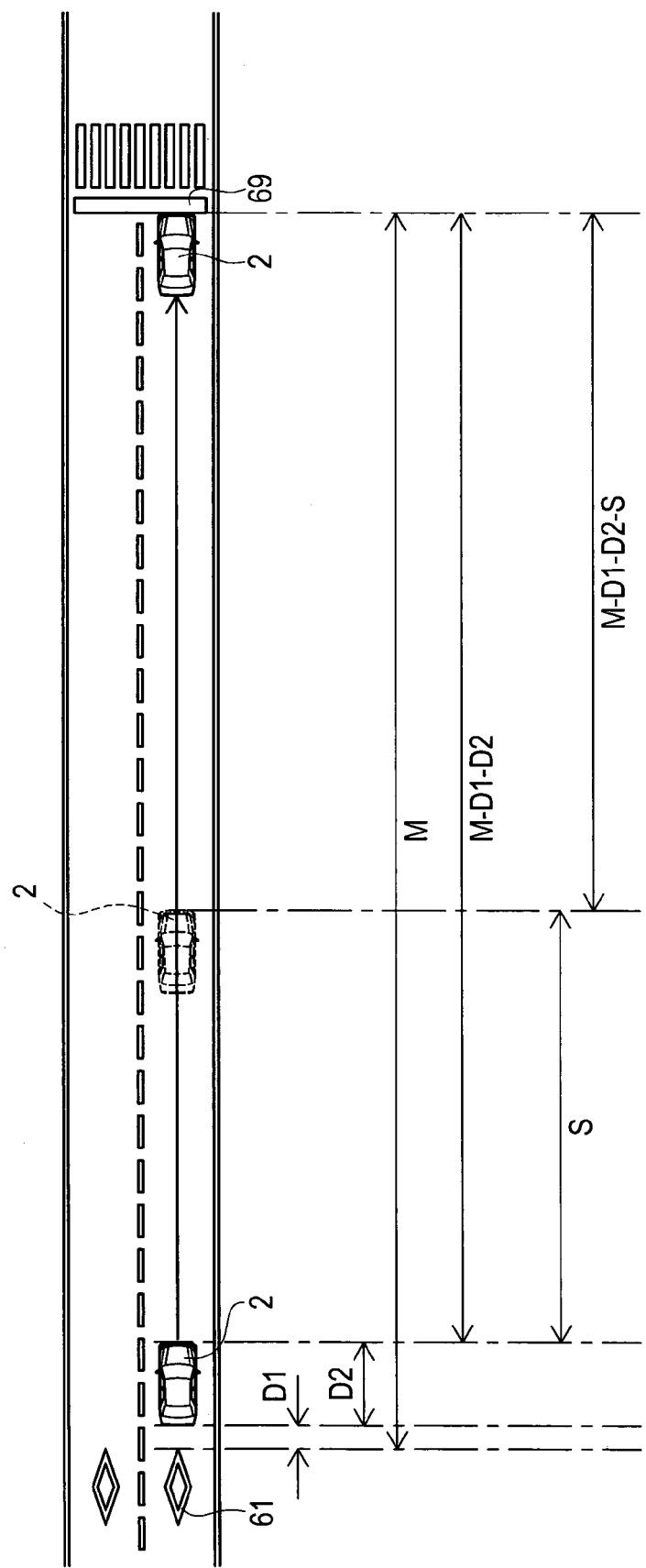

ically, such an arrangement stores beforehand the position information for identifying the position at which each road marking has been formed, and the distance along the road between each road marking and the corresponding control target in the vicinity of the road marking (which will be referred to as the "marking-target distance" hereafter). With such an arrangement, each road marking formed on the surface of the road on which the vehicle is traveling is detected using the rear-side camera. Then, the distance along the road between the vehicle and the control target (which will be referred to as the "target-vehicle distance" hereafter) is calculated with high precision based upon the marking-target distance between the road marking thus detected and the control target. With such an arrangement, appropriate control is performed at an appropriate timing based upon the marking-target distance thus calculated, thereby allowing a notice to be given to the driver, or allowing vehicle control such as deceleration to be performed, according to the control targets.

DRIVING ASSISTANCE APPARATUS

TECHNICAL FIELD

The present invention relates to a driving assistance apparatus which detects road markings formed on the surface of a road so as to assist the user to drive a vehicle appropriately according to such control targets.

BACKGROUND ART

Conventional driving assistance apparatuses have been proposed that acquire road information from map data stored in a navigation apparatus, or acquire various types of information with respect to traveling a vehicle such as the current position of the vehicle detected by means of a GPS or the like, so as to give a notice to the driver, so as to assist the driver to drive the vehicle, and so as to intervene in the driving of the vehicle, thereby preventing traffic accidents.

Examples of such driving assistance apparatuses include an apparatus which includes an image acquisition section such as a camera or the like on the front side of the vehicle in order to provide necessary notices and to perform control for the vehicle at a more precise timing. With such an arrangement, a notice is given to the driver and the vehicle is controlled based upon the images thus acquired. For example, a vehicle driving assistance apparatus is described in Japanese Unexamined Patent Application Publication No. 2004-86363 (pp. 8 to 10, FIG. 4), which detects a brief stop line formed on the road on which the vehicle is traveling, based upon image data acquired by means of a CCD camera mounted such that it faces forward of the vehicle, and which provides driving assistance in the vicinity of intersections based upon the detection results.

DISCLOSURE OF THE INVENTION

Problems to be Solved by the Invention

With such a vehicle driving assistance apparatus described in the aforementioned Japanese Unexamined Patent Application Publication No. 2004-86363 (pp. 8 to 10, FIG. 4), a brief stop line, which is a control target, is directly detected by means of a CCD camera or the like, and a guidance is provided or the vehicle is controlled according to the control target thus detected. However, such apparatuses have the following problems.

First, in order to provide guidance or to control the vehicle according to the control target, there is a need to detect the control target in a state in which there is a certain distance between the control target and the vehicle. Accordingly, such an apparatus requires a high-performance camera for acquiring a high resolution image of such a control target that is far away from the vehicle, which is a high-cost system. Furthermore, even with an apparatus including such a high-performance camera, there is a limit to the distance between the vehicle and the control target which can be detected. In some cases, such an arrangement cannot detect an image of the control target within a predetermined time before the timing at which a guidance is to be provided or the vehicle is to be controlled. Moreover, in a case in which, for some reason, such a control target is not detected, such an arrangement can neither provide a necessary guidance nor control the vehicle according to the control target.

Furthermore, in a case in which, in the traveling state, the camera mounted on the vehicle acquires an image of a driving control target provided in the form of a line extending orthogonal to the vehicle traveling direction (e.g., brief stop line), in some cases, the control target is blurred in the image thus acquired, leading to a situation in which the control target cannot be correctly identified.

In order to solve the aforementioned problems, an arrangement is conceivable to calculate the distance between the vehicle and the control target with higher precision using a rear-side camera which acquires an image of the rearward view of the vehicle, and road markings formed on the road which indicate the maximum speed, arrows, etc. Specifically, such an arrangement stores beforehand the position information for identifying the position at which each road marking has been formed, and the distance along the road between each road marking and the corresponding control target in the vicinity of the road marking (which will be referred to as the "marking-target distance" hereafter). With such an arrangement, each road marking formed on the surface of the road on which the vehicle is traveling is detected using the rear-side camera. Then, the distance along the road between the vehicle and the control target (which will be referred to as the "target-vehicle distance" hereafter) is calculated with high precision based upon the marking-target distance between the road marking thus detected and the control target. With such an arrangement, appropriate control is performed at an appropriate timing based upon the marking-target distance thus calculated, thereby allowing a notice to be given to the driver, or allowing vehicle control such as deceleration to be performed, according to the control targets.

Description has been made regarding an arrangement in which each control target is associated with a road marking, and the distance between the vehicle and the control target is calculated based upon the information with respect to the road marking and the control target thus associated. However, such an arrangement has a problem, particularly in a case in which there are multiple control targets associated with a given road marking. Description will be made below regarding this problem with reference to the following specific example. In this specific example, a vehicle 102 is driven on a road 101 that diverges as shown in FIG. 16. Furthermore, a road marking 103 which has been formed on the road surface of the road 101, and which indicates that the maximum speed is 40 km/h, is associated with two control targets, i.e., a first stop line 105 formed on the road surface of a first branch road 104 and also a second stop line 107 formed on the road surface of a second branch road 106.

In this case, a database mounted in the vehicle 102 stores beforehand a first marking-target distance M1 which is the marking-target distance between the road marking 103 and the first stop line 105 and a second marking-target distance M2 which is the marking-target distance between the road marking 103 and the second stop line 107, each of which is associated with the road marking 103.

After the road marking 103 is detected by means of a rear-side camera as the vehicle 102 is traveling, such an arrangement can calculate the first target-vehicle distance T1, which is the target-vehicle distance between the vehicle 102 and the first stop line 105, and the second target-vehicle distance T2 which is the target-vehicle distance between the vehicle 102 and the second stop line 107.

However, with such an arrangement, determination cannot been made with respect to which branch road the vehicle 102 will enter before the vehicle 102 passes through the divergence in the road. Accordingly, in this case, before the vehicle 102 passes through the divergence in the road, there is a need to select one from among the first stop line 105 and the second stop line 107, according to which a notice is given to the driver or a vehicle control is performed, which is a problem. Let us consider an arrangement in which the control targets are selected in descending order of distance along the road on which the vehicle 102 is traveling, and which gives a notice to the driver or performs a vehicle control according to the control target thus selected. With such an arrangement, after the selection of the control target, in a case in which the vehicle enters a different branch road, i.e., if the distance along the road up to the control target is smaller than it would be if the vehicle had entered the branch road having the control target thus selected, in some cases, a notice cannot be given to the driver or the vehicle control cannot be performed in a predetermined time. Accordingly, an arrangement is preferably made in which, before the vehicle passes through the divergence in the road, a notice is given to the driver or a vehicle control is performed according to a control target selected in ascending order of distance along the road on which the vehicle is to travel. Accordingly, an arrangement is conceivable in which comparison processing is performed based upon the information stored in the database with respect to the marking-target distance which is the distance between a road marking and a control target, and a notice is given to the driver or vehicle control is performed with respect to the control target positioned at a shorter marking-target distance before the vehicle passes through a divergence.

However, even with such an arrangement, the following problem remains in a case in which there is almost no difference in the marking-target distance, which is the distance between the road marking and each control target (in the example shown in FIG. 16, the first marking-target distance M1 and the second marking-target distance M2). That is to say, the marking-target distance stored in the database was measured along the centerline of the road that connects the road marking and each control target. However, the vehicle can wind along the road, or can change lanes. Accordingly, there is a certain amount of difference between the marking-target distance stored in the database and the actual distance along the road on which the vehicle actually travels. Furthermore, in many cases, the road on which the control target has been formed is a narrow street. In such a case, there is often a certain amount of difference between the actual marking-target distance and the marking-target distance stored in the database.

Accordingly, in a case in which there is almost no difference between the first marking-target distance M1 and the second marking-target distance M2, the control target stored in the database in association with the shorter marking-target distance does not necessarily match the actual control target positioned at a shorter distance along the road on which the vehicle is to travel to the control target. That is to say, in such a case, the control target cannot be selected with high precision in ascending order of distance along the road on which the vehicle is driven. Accordingly, before the vehicle passes through the divergence in the road, it is extremely difficult to select the control target according to which a notice is given to the driver or a vehicle control is performed. In an arrangement in which a desired one from among these control targets is selected and used before the vehicle passes through the divergence in the road, this leads to a useless notice or an erroneous control.

The present invention has been made in order to solve the aforementioned problems in the conventional techniques. Accordingly, it is an object of the present invention to provide a driving assistance apparatus which provides driving assistance according to appropriate control targets without useless guidance and erroneous control even if multiple control targets are associated with a road marking detected by the vehicle.

Means for Solving the Problems

In order to achieve the aforementioned object, a driving assistance apparatus according to a first aspect of the present specification comprises: a marking information storage section (42) which stores position information with respect to road markings formed on a road, with the position of each road marking being stored associated with at least one marking-target distance which is the distance along the road between the road marking and a control target; a image acquisition section (3) which is mounted on the vehicle (2), and which acquires an image of the vehicle's surroundings; a road marking detection section (6) which detects, based upon an image acquired by the image acquisition section (3), a road marking formed on the road on which the vehicle is traveling; a marking-target distance acquisition section (6) which acquires, by the marking information storage section (42), at least one marking-target distance between the road marking and the control target which is associated with the road marking detected by the road marking detection section (6); a target-vehicle distance calculation section (6) configured such that, in a case in which there is a single control target associated with a road marking, or in a case in which there are multiple control targets associated with a road marking, and the difference in the marking-target distance thus acquired by the marking-target distance acquisition section (6) is equal to or greater than a predetermined distance, a target-vehicle distance, which is the distance along the road between the vehicle and the control target thus associated with the road marking, is calculated; and a driving assistance section (6) which assists the user to drive the vehicle based upon the calculation results calculated by the target-vehicle distance calculation section (6).

It should be noted that the term "road marking" as used here represents a marking formed of paint, raised markings, or the like, which is provided on the surface of the road in the form of a predetermined pattern of lines, a character string, a symbol, etc., which provides necessary information, guidance, warnings, regulations, instructions, etc., examples of which include stop lines, pedestrian crossings, etc.

On the other hand, the term "control target" as used here represents a target on the road according to which driving assistance (e.g., guidance with respect to the control target, and/or vehicle control with respect to the control target) is to be provided to the user, examples of which include a brief stop line, an intersection, an entrance to a curve, a merging lane, etc.

Also, a driving assistance apparatus according to a second aspect relates to the driving assistance apparatus described in the first aspect. The driving assistance apparatus further comprises: a road information storage section (41) which stores information with respect to the road; and a road divergence determination section (6) which determines, based upon the road information, whether or not the road diverges forward of the vehicle. With such an arrangement, the target-vehicle distance calculation section (6) includes a target count determination section configured such that, in a case in which the road divergence determination section (6) has determined that the road diverges ahead, the target count determination section determines whether or not there are multiple control targets associated with a road marking detected by the road marking detection section (6). In a case in which the target count determination section has determined that there are multiple control targets associated with the road marking, and in a case in which the difference in the marking-target distance acquired by the marking-target distance acquisition section (6) is equal to or greater than a predetermined distance, the target-vehicle distance, which is the distance between the vehicle and the associated control target, is calculated.

Also, a driving assistance apparatus according to a third aspect relates to the driving assistance apparatus described in the second aspect. With the driving assistance apparatus, before the vehicle (2) passes through the divergence in the road, the driving assistance section (6) assists the user to drive the vehicle based upon the calculation results calculated by the target-vehicle distance calculation section (6) with respect to the control target positioned at the shortest marking-target distance between the road marking and the control target. After the vehicle passes through the divergence in the road, the driving assistance section (6) assists the user to drive the vehicle based upon the calculation results calculated by the target-vehicle distance calculation section (6) with respect to the control target formed on the branch road which the vehicle has entered.

Also, a driving assistance apparatus according to a forth aspect relates to the driving assistance apparatus described in the second or third aspect. The driving assistance apparatus further comprises a subsequent route road determination section (6) configured such that, in a case in which the road divergence determination section (6) has determined that the current road diverges ahead, the subsequent route road determination section (6) determines whether or not there is a branch road that has a subsequent route road relation with the current road. With such an arrangement, in a case in which the subsequent route road determination section (6) has determined that there is a branch road having a subsequent route road relation with the current road on which the vehicle is traveling, the driving assistance section (6) assists the user to drive the vehicle based upon the calculation results calculated by the target-vehicle distance calculation section (6) with respect to the control target formed on the branch road for which it has been thus determined that a subsequent route road relation exists with respect to the current road.

Also, a driving assistance apparatus according to a fifth aspect relates to the driving assistance apparatus described in any one of the second to fourth aspect. The driving assistance apparatus further comprises: a guided route setting section (6) which sets a guided route which is a target route for the driving guidance; and a guided route determination section (6) configured such that, in a case in which the road divergence determination section (6) has determined that the current road diverges ahead, the guided route determination section (6) determines whether or not there is a branch road that has been set to be the guided route. With such an arrangement, in a case in which the guided route determination section (6) has determined that there is a branch road that has been set to be the guided route, the driving assistance section (6) assists the user to drive the vehicle based upon the calculation results calculated by the target-vehicle distance calculation section (6) with respect to the control target formed on the branch road which has been thus determined to have been set to be the guided route.

Also, a driving assistance apparatus according to a sixth aspect relates to the driving assistance apparatus described in any one of the first to fifth aspects. The driving assistance apparatus further comprises a vehicle control section (5) which controls the vehicle (2). With such an arrangement, the driving assistance section (6) controls the vehicle (2) by means of the vehicle control section (5) based upon the target-vehicle distance between the vehicle and the control target.

Also, a driving assistance apparatus according to a seventh aspect relates to the driving assistance apparatus described in any one of the first to fifth aspects. The driving assistance apparatus further comprises a driving guidance section (7, 8) which provides traveling guidance to the user. With such an arrangement, the driving assistance section (6) provides guidance by means of the traveling guidance section (7, 8) based upon the target-vehicle distance between the vehicle (2) and the control target.

Effects of the Invention

With a driving assistance apparatus having the aforementioned configuration described in the first aspect, in a case in which there are multiple control targets associated with a road marking detected by the vehicle, the driving assistance apparatus neither provides guidance nor performs vehicle control in a situation in which it could either provide useless guidance or perform false control. Such an arrangement provides suitable notices and performs suitable vehicle control with respect to the associated control target for the driver. Furthermore, such an arrangement reduces the amount of calculation processing, thereby reducing the processing load of the control unit.

Also, with a driving assistance apparatus having the aforementioned configuration described in the second aspect, in a case in which the vehicle is traveling on a road that diverges ahead, and in a case in which there are multiple control targets which have been formed on the respective branch roads and which are associated with a road marking detected by the vehicle, the driving assistance apparatus neither provides guidance nor performs vehicle control in a situation in which it could either provide useless guidance or perform false control. Such an arrangement provides suitable notices and performs suitable vehicle control with respect to the correct control target formed on the branch road on which the vehicle is traveling. Furthermore, such an arrangement reduces the amount of calculation processing, thereby reducing the processing load of the control unit.

Also, with a driving assistance apparatus having the aforementioned configuration described in the third aspect, in a case in which the vehicle is traveling on a road that diverges ahead, and in a case in which there are multiple control targets which have been formed on the respective branch roads and which are associated with a road marking detected by the vehicle, the driving assistance apparatus neither provides guidance nor performs vehicle control in a situation in which it could either provide useless guidance or perform false control before the vehicle reaches the divergence in the road. Such an arrangement eliminates the danger of confusing the driver. Furthermore, after the vehicle passes over the divergence in the road, such an arrangement provides suitable notices and performs suitable vehicle control with respect to the correct control target formed on the branch road on which the vehicle is traveling.

Also, with a driving assistance apparatus having the aforementioned configuration described in the fourth aspect, it is predicted that the vehicle will travel on the branch road that has a subsequent route road relation with the current road. With such an arrangement, the driving assistance apparatus provides notices and performs vehicle control with respect to the control target formed on the road which the vehicle is predicted to travel. Such an arrangement prevents useless guidance operations and false control from being performed.

Also, with a driving assistance apparatus having the aforementioned configuration described in the fifth aspect, it is predicted that the vehicle will travel on the branch road set to be the guided route. With such an arrangement, the driving assistance apparatus provides notices and performs vehicle control with respect to the control target formed on the road thus predicted to be the road on which the vehicle will be driven. Such an arrangement prevents useless guidance and false control from being performed.

Also, with a driving assistance apparatus having the aforementioned configuration described in the sixth aspect, vehicle control is performed based upon the target-vehicle distance which is the distance between the vehicle and the control target. Thus, such an arrangement ensures that suitable vehicle control is performed according to the type of control target without involving high-cost devices such as image acquisition devices employed as a front camera for acquiring an image of the view far from the vehicle.

Also, with a driving assistance apparatus having the aforementioned configuration described in the seventh aspect, guidance is provided based upon the target-vehicle distance which is the distance between the vehicle and the control target. Thus, such an arrangement ensures that suitable driving guidance is provided according to the type of control target without involving high-cost devices such as image acquisition devices employed as a front camera for acquiring an image of the view far from the vehicle.

BRIEF DESCRIPTION OF THE DRAWINGS

FIG. 3 is a diagram which shows a storage region of a road marking DB according to the present embodiment;

FIG. 4 is a diagram which shows the content of the vehicle control and the content of the guidance with respect to the control target for each control;

FIG. 8A is a schematic diagram which shows measurement start points for a "pedestrian crossing ahead" marking on the road;

FIG. 8B is a schematic diagram which shows measurement start points for a "maximum speed (20 km/h)" marking on the road;

FIG. 9 is a schematic diagram for describing a calculation method for calculating the target-vehicle distance between the vehicle and the control target after an image of the road marking is acquired by means of the rear-side camera mounted on the vehicle;

BEST MODES FOR CARRYING OUT THE INVENTION

Detailed description will be made below regarding a driving assistance apparatus according to an embodiment of the present invention with reference to the drawings.

Figure 1:
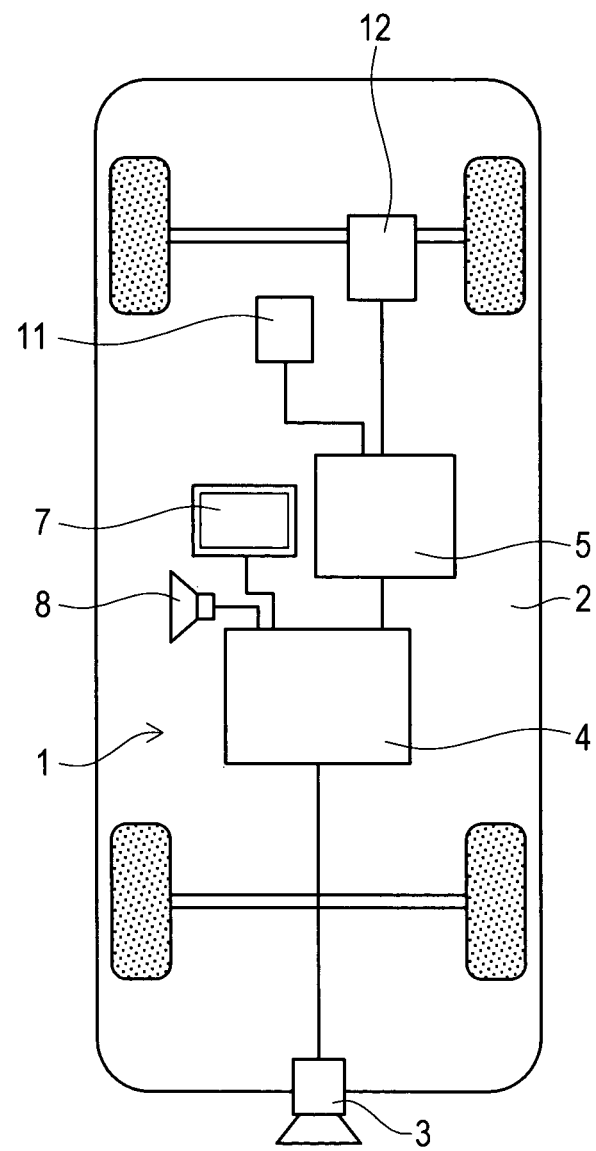
FIG. 1 is a schematic configuration diagram which shows a driving assistance apparatus according to the present embodiment.

First, description will be made regarding a schematic configuration of a driving assistance apparatus 1 according to the present invention with reference to FIG. 1. FIG. 1 is a schematic configuration diagram which shows the driving assistance apparatus 1 according to the present embodiment.

As shown in FIG. 1, the driving assistance apparatus 1 according to the present embodiment has a configuration including a rear-side camera (the image acquisition section) 3, a navigation apparatus 4, a vehicle ECU (the vehicle control section) 5, etc., installed in the vehicle 2.

The rear-side camera 3 is a camera employing a solid-state image acquisition device such as a CCD or the like, for example. The rear-side camera 3 is mounted in the vicinity of the upper-central region of the number plate mounted on the rear side of the vehicle 2, with the line of sight directed downwards at a 45 degree angle from the horizontal plane. With such an arrangement, the rear-side camera acquires an image of the rearward view from the vehicle, which matches the traveling direction of the vehicle 2 when the vehicle 2 is being parked. The image thus acquired (which will be referred to as the "BGM (back guide monitor) image" hereafter) is displayed on a liquid crystal display 7 included in the navigation apparatus. On the other hand, in the normal traveling mode, the rear-side camera acquires images of road markings such as stop lines, crosswalks, character strings, markings formed on the road surface which indicate the maximum permissible speed for a vehicle, etc, which are formed on the surface of the road around the vehicle 2. Furthermore, the distance between the vehicle 2 and control targets such as a stop line, intersection, merging lane, entrance to a curve, etc., according to which vehicle control is to be performed, is indirectly calculated based upon the image of the road markings thus acquired.

The navigation apparatus 4 has a configuration including: a navigation ECU (the electronic control unit) 6; a liquid crystal display (the traveling guidance section) 7 mounted on the center console or panel face in the cabin of the vehicle 2 for displaying a map or the detected route to the destination; a speaker (the driving guidance section 8) which outputs voice guidance with respect to route guidance; a current position detection unit 9 which identifies on a map the current position and the traveling direction of the vehicle 2; a data storage unit 10 which stores map data for displaying the map and the information with respect to the type and positions of road markings formed on the surface of the road; and a communication device 14 which communicates with an information center etc.

The navigation ECU (the road marking detection section, the marking-target distance acquisition section, the target-vehicle distance calculation section, the driving assistance section, the target-vehicle distance section, the subsequent route road determination section, the guided route setting section, and guided route determination section) 6 is an electronic control unit which performs: detection processing for detecting road markings formed on the surface of the road on which the vehicle 2 is traveling based upon acquired images acquired by the rear-side camera 3; calculation processing for indirectly calculating the distance along the road from the vehicle 2 up to a control target such as a stop line, intersection, merging lane, entrance to a curve, etc., based upon the road marking thus detected; notification processing and vehicle control processing performed based upon the distance thus calculated with respect to the control target thus detected, in addition to ordinary route search processing and route guidance processing. It should be noted that description will be made later regarding the detailed configuration of the navigation ECU 6.

The vehicle ECU 5 is an electronic control unit of the vehicle 2, which controls the operations of an engine, transmission, accelerator, brake, etc. A brake actuator 11, an accelerator actuator 12, and an AT (Automatic Transmission) 13 are connected to the vehicle ECU 5. With such an arrangement, in a case in which a predetermined condition has been satisfied, the navigation ECU 6 transmits control signals to the brake actuator 11, the accelerator actuator 12, and the AT 13 via the vehicle ECU 5 so as to adjust the brake pressure, the air intake in the engine, and the gear ratio, thereby providing an automatic driving control function.

Figure 2:
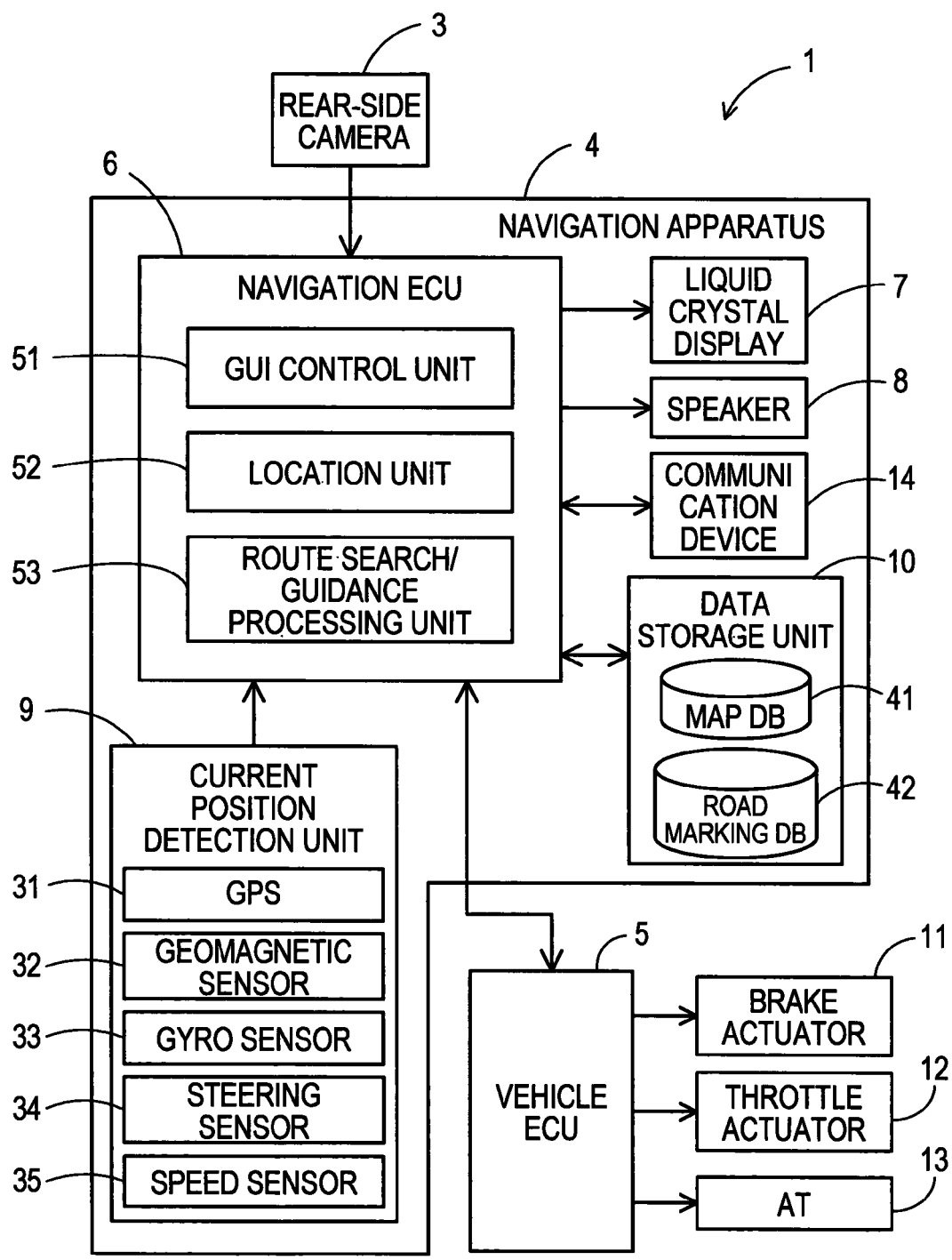
FIG. 2 is a schematic block diagram which shows a control system of the driving assistance apparatus according to the present embodiment.

Next, description will be made with reference to FIG. 2 regarding the configuration of a control system of the driving assistance apparatus 1 according to the present embodiment, particularly and mainly regarding the navigation apparatus 4. FIG. 2 is a schematic block diagram which shows the control system of the driving assistance apparatus 1 according to the present embodiment.

In FIG. 2, the control system of the driving assistance apparatus 1 has a basic configuration including the navigation apparatus 4 and the vehicle ECU 5. With such an arrangement, predetermined peripheral devices are connected to each control means.

Description will be made below regarding each component of the navigation apparatus 4. The current position detection unit 9 includes a GPS 31, a geomagnetic sensor 32, a gyro sensor 33, a steering sensor 34, a speed sensor 35, an altimeter (not shown), etc., which allows the current position of the user vehicle, the direction, the speed of the user vehicle, the traveling distance from a predetermined position, etc., to be detected.

Specifically, the GPS 31 detects the current position of the user vehicle on the earth and the current time by receiving radio waves transmitted from satellites.

The geomagnetic sensor 32 detects the orientation of the user vehicle by geomagnetic measurement.

The gyro sensor 33 detects the turning angle of the user vehicle. With such an arrangement, the turning angle thus detected by the gyro sensor 33 is integrated so as to obtain the orientation of the user vehicle.

The steering sensor 34 is mounted within the steering device, which detects the turning angle of the steering.

The speed sensor 35 detects the speed of the user vehicle or the movement speed (integrated movement distance) based upon vehicle speed pulses generated at predetermined intervals of the distance traveled.

The data storage unit 10 includes a hard disk (not shown) which serves as an external storage device and a recording medium, and a recording head (not shown) which is a driver that provides: a function of reading data sets stored in the hard disk, i.e., a predetermined program, a map DB 41 which stores the information necessary for the navigation apparatus 4 to provide the route guidance and to display a map, a road marking DB (the marking information storage section) 42 which stores the information with respect to the road markings, etc.; and a function of writing predetermined data to the hard disk.

Here, the map DB 41 is a database which stores the map information necessary for the navigation apparatus 4 to provide the route guidance and to display a map. Examples of the map information include: map data for displaying a map; intersection data with respect to each intersection; node data with respect to nodes; road data with respect to roads; route search data for searching for a route; facility data with respect to facilities; location search data for searching for a location; etc.

Furthermore, the road marking DB 42 is a database which stores the road marking information with respect to the road markings formed on the surface of the roads. Examples of the road marking information include: road marking type information with respect to the type of road markings formed on the surface of the road (e.g., stop lines, pedestrian crossings, character strings, maximum speed markings); identification information for identifying the type of road marking detected; coordinate data for identifying the position of a road marking on the map; etc. Note that detailed description will be made later regarding the road marking DB 42 with reference to FIG. 3.

The navigation ECU 6 includes: a CPU which serves as a computation device and a control device which performs overall control for the navigation apparatus 4; and an internal storage device such as RAM which is used as working memory in various types of computation processing performed by the CPU, and which stores the route data etc., obtained as a result of a route search; and ROM or the like which stores a control program, a route guidance processing program which instructs the CPU to made a search for a route to a destination and to provide guidance with respect to the guided route thus detected in the search, and a driving assistance processing program (see FIG. 12 through FIG. 14) described later, which instructs the CPU to calculate the distance (target-vehicle distance) along the road between the vehicle 2 and a control target (stop line, intersection, merging lane, entrance to curve, etc.) under a predetermined condition based upon images acquired by the rear-side camera 3, and to perform driving assistance processing. It should be noted that semiconductor memory, magnetic core storage, etc., are employed as the aforementioned RAM, ROM, etc. Also, the CPU may be replaced by an MPU or the like as the computation device and the control device.

Furthermore, the navigation ECU 6 includes a GUI control unit 51, a location unit 52, and a route search/guidance processing unit 53. The navigation ECU 6 performs various types of control based upon the information acquired from the rear-side camera 3, the current position detection unit 9, the data storage unit 10, and various types of peripheral circuits.

With such an arrangement, the CUI control unit 51 displays on the liquid crystal display 7 an appropriate image of a map around the user vehicle based upon the map data read out from the map DB 41 and the current position of the user vehicle detected by the location unit 52. Furthermore, when route guidance is requested, the GUI control unit 51 superimposes icons, a guidance screen, a detected route, etc., on the map image, and displays the composite image thus created on the liquid crystal display 7.

The location unit 52 detects the current absolute position (latitude and longitude) of the vehicle 2 based upon the various types of information supplied from the current position detection unit 9. Furthermore, the location unit 52 determines whether or not there is a road marking within a predetermined range from the vehicle 2 (between a position 30 m forward of and a position 20 m behind the vehicle) based upon the current position thus detected and the information stored in the road marking DB 42. In a case in which there is a road marking within this range, the location unit 52 acquires the images acquired by the rear-side camera 3, and performs analysis processing so as to detect the road marking formed on the surface of the road. In a case in which the road marking thus detected is associated with only a single control target, or in a case in which the road marking thus detected is associated with multiple control targets, and difference in the marking-target distance, which is the distance between the road marking and each control target, is equal to or greater than a predetermined distance (e.g., 5 m), the location unit 52 calculates the distance between the vehicle 2 and the road marking thus detected based upon the images thus acquired, and calculates the distance between the vehicle 2 and the control target associated with the road marking based upon the distance between the road marking and the vehicle 2 thus calculated. Such an arrangement controls the brake actuator 11, the throttle actuator 12, and the AT 13 based upon the distance thus calculated, so as to execute vehicle control for the vehicle 2. Alternatively, such an arrangement controls the liquid crystal display 7 and the speaker 8 so as to provide a notice with respect to the control target.

Furthermore, when a destination is set, the route search/guidance processing unit 53 searches for the route and sets a guided route from the current position up to the destination, based upon the node data and the search data stored in the data storage unit 10. Moreover, the route search/guidance processing unit 53 performs route guidance based upon the guided route thus set, using the liquid crystal display 7 and the speaker 8.

Furthermore, various types of peripheral devices such as the liquid crystal display 7, the speaker 8, the communication device 14, etc., are electrically connected to the aforementioned navigation ECU 6.

The liquid crystal display 7 displays operation guidance, an operation menu, key guidance, a guided route from the current position to the destination, guidance information along the guided route, traffic information, news, weather forecast, the time, a mail, a TV program, a BGM image acquired by the rear-side camera 3, etc.

In addition, the speaker 8 outputs voice guidance so as to provide guidance for the travel along the guided route according to the instruction from the navigation ECU 6. Furthermore, when the target-vehicle distance between the vehicle 2 and a control target becomes a predetermined distance, the navigation apparatus 4 according to the present embodiment provides information or a notice with respect to the control target (e.g., a warning which notifies the user that the vehicle is approaching a stop line) via the liquid crystal display 7 and the speaker 8.

The communication device 14 is a beacon receiver which receives traffic jam information, traffic regulation information, parking information, traffic accident information, service area crowdedness information, etc., provided in the form of a radio-wave beacon signal, light beacon signal, or the like, which is received via radio-wave beacon devices, light beacon devices, or the like, installed along the road, from an information center, e.g., a VICS (trademark; Vehicle Information and Communication System) center or the like. With such an arrangement, the navigation apparatus 4 according to the present embodiment is connected to the information center (not shown) via the communication device 14 so as to update the information stored in the map DB 41 and the road marking DB 42.

Next, description will be made with respect to FIG. 3 regarding the road marking DB 42 which is included in the data storage unit 10 and which stores the information with respect to the road markings. FIG. 3 is a diagram which shows a storage region of the road marking DB 42 according to the present embodiment.

As shown in FIG. 3, the storage region of the road marking DB 42 includes the coordinate data (position data) of the road markings on the map, the data of the type of road markings, the data of the control targets associated with the respective road markings, the data of the distances (marking-target distances) between each control target and a corresponding measurement start position (in a case in which there are multiple measurement start positions, the measurement start position closest to the corresponding control target is stored).

For example, as shown in FIG. 3, there is a road marking "pedestrian crossing ahead" at the coordinates (x1, y2). Furthermore, 60 m forward of this road marking, there is an associated road marking "stop line", which serves as a control target.

Also, there is an "arrow" road marking at the coordinates (x2, y2). Furthermore, 54 m forward of this road marking, there is a corner (a node which represents the start point of a corner), which serves as a control target.

Also, there is a road marking "maximum speed (40 km/h)" at the coordinates (x3, y3). Furthermore, 112 m forward of this road marking, there is an associated road marking "stop line", which serves as a first control target, and another associated road marking "stop line" 72 m forward of the road marking, which serves as a second control target.

Also, there is a road marking in the form of a character string (e.g., "curve ahead", "stop", "to ABC", etc.) at the coordinates (x4, y4). Furthermore, 82 m forward of this road marking, there is an associated road marking "stop line", which serves as a first control target, and another associated road marking "stop line" 85 m forward of the road marking, which serves as a second control target.

Also, there is a road marking "pedestrian crossing" at the coordinates (x5, y5). Furthermore, 108 m forward of this road marking, there is an associated "intersection (intersection node)", which serves as a control target. It should be noted that the coordinates of each road marking is represented by four coordinate sets each of which represents the position of a corner of a rectangle surrounding the road marking. Also, three or more control targets may be associated with a single road marking. Also, in a case in which there are multiple lanes on the road over the target-vehicle distance between the vehicle and the control target, the target-vehicle distance is stored for each lane.

Here, a control target is a target according to which guidance or vehicle control is to be performed. A node or a different road marking, which is positioned in the traveling direction of the vehicle on the road which the road marking is formed and in a predetermined range (e.g., 10 m to 200 m forward of the vehicle), is set to be such a control driving target. With such an arrangement, when the rear-side camera 3 acquires an image of any one of the road markings stored in the road marking DB 42, the navigation ECU 6 indirectly calculates the target-vehicle distance, which is the distance along the road between the vehicle and the associated control target, based upon the image thus acquired. When the target-vehicle distance becomes a predetermined distance, the navigation ECU 6 performs the vehicle control for the vehicle 2 or provides guidance with respect to the control target.

The content of the vehicle control for the vehicle 2 and the content of the guidance are changed based upon the type of associated control target and the control level.

Here, the control level is selected from among multiple levels, based upon the situation of the vehicle and the situation of the driver, which represent the degree of necessity of performing the vehicle control and providing guidance with respect to the control target. Specifically, in a case in which a sufficient deceleration control has not been performed in a state in which the vehicle is approaching a control target, determination is made that the control level should be set to a high level. On the other hand, in a case in which a sufficient deceleration control has been performed in such a state, determination is made that the control level should be set to a low level. With the present embodiment, in particular, when the target-vehicle distance between the vehicle and the control target becomes a predetermined distance (e.g., in a case in which the control target is a stop line or a curve, the predetermined distance is set to 50 m), the necessary deceleration (the force G applied to the vehicle due to deceleration) G1 with respect to the control target is calculated based upon the current speed and acceleration of the user vehicle. Then, the control level is determined based upon the necessary deceleration thus calculated, thereby selecting the content of the vehicle control and the content of the guidance. It should be noted that FIG. 4 shows the content of the vehicle control and the content of the guidance with respect to the control target for each control level in the form of a list.

(1) As shown in FIG. 4, in a case in which the calculated necessary deceleration G1 is smaller than 0.05 G, determination is made that the control level should be set to the "unnecessary level", whereupon neither the control nor the guidance is performed.

(2) In a case in which the necessary deceleration G1 is equal to or greater than 0.05 G and smaller than 0.1 G, determination is made that the control level should be set to the "low level", which is an information service level, whereupon only the guidance is provided. For example, in a case in which the vehicle is approaching a "stop line" or a "corner" set to be a control target, such an arrangement instructs the liquid crystal display 7 to display a mark which represents the stop line or the corner, thereby notifying the driver that the vehicle is approaching the stop line or the corner.

(3) In a case in which the necessary deceleration G1 is equal to or greater than 0.1 G and smaller than 0.3 G, determination is made that the control level should be set to the "middle level", whereupon only reminder-level guidance is provided. For example, in a case in which the vehicle is approaching a "stop line" or a "corner" set to be a control target, such an arrangement displays a character string "stop line (corner) ahead" on the liquid crystal display 7, or outputs a warning with respect to the same content in the form of voice guidance via the speaker 8, which is a warning that the vehicle is approaching the control target.

(4) In a case in which the necessary deceleration G1 is greater than 0.3 G, determination is made that the control level should be set to the "high level", whereupon a vehicle control and guidance are performed at a support level or a intervention level. For example, in a case in which the vehicle is approaching a "stop line" or a "corner" set to be a control target, such an arrangement displays a character string "stop line (corner) ahead" on the liquid crystal display 7, and outputs a warning with respect to the same content in the form of voice guidance via the speaker 8, which is a warning that the vehicle is approaching the stop line or the corner. Furthermore, in a case in which this control target matches a "stop line", such an arrangement performs a deceleration control for the brake actuator 11 and the AT 13 such that the vehicle 2 stops before the stop line. On the other hand, in a case in which this control target matches a "corner", such an arrangement performs a deceleration control for the brake actuator 11 and the AT 13 such that, before the vehicle enters the corner, the vehicle is being driven at an optimum speed for the R of the corner stored in the map DB 41 (e.g., 40 km/h for a curve at R=30).

It should be noted that, in a case in which the vehicle is approaching an "intersection" set to be a control target, such an arrangement does not perform the vehicle control. In this case, when the target-vehicle distance between the vehicle and the control target becomes a predetermined distance (e.g., 10 m), such an arrangement performs only the route guidance according to the guided route thus set. For example, in this case, such an arrangement displays a guidance image on the liquid crystal display 7, which notifies the driver that the vehicle should turn left. Furthermore, such an arrangement outputs the voice guidance "Turn left at the next intersection," via the speaker 8.

Next, description will be made with reference to a specific example, shown in FIG. 5 through FIG. 9 regarding a calculation method for calculating the distance between the vehicle 2 and a road marking when an image of the road marking is acquired by the rear-side camera 3 of the vehicle 2, and the distance between the vehicle 2 and a control target associated with the road marking.

Figure 5:
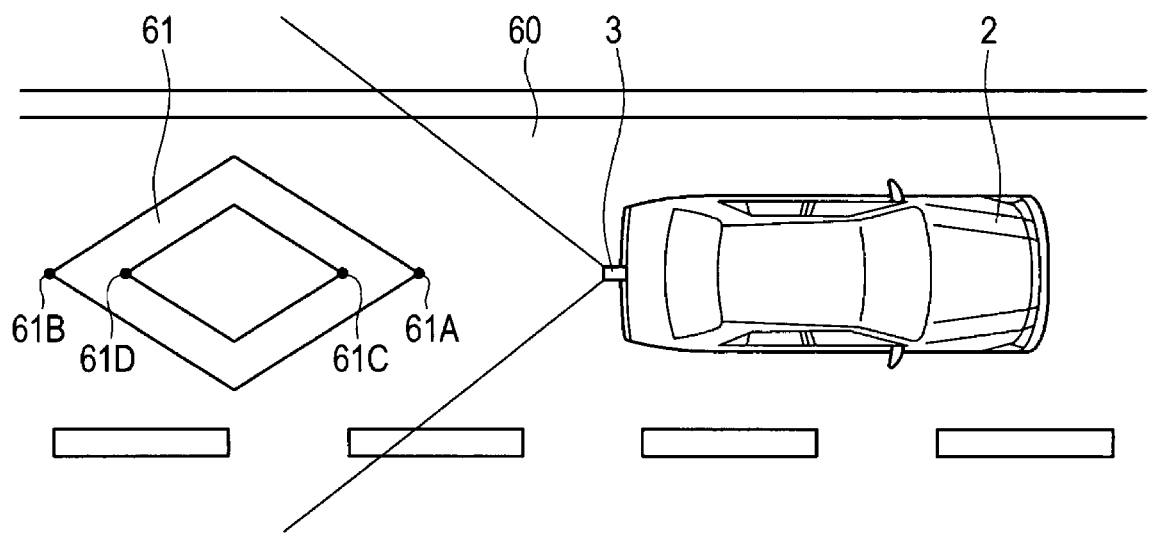
FIG. 5 is a top view which shows the vehicle when an image of the road marking is acquired.
Figure 6:
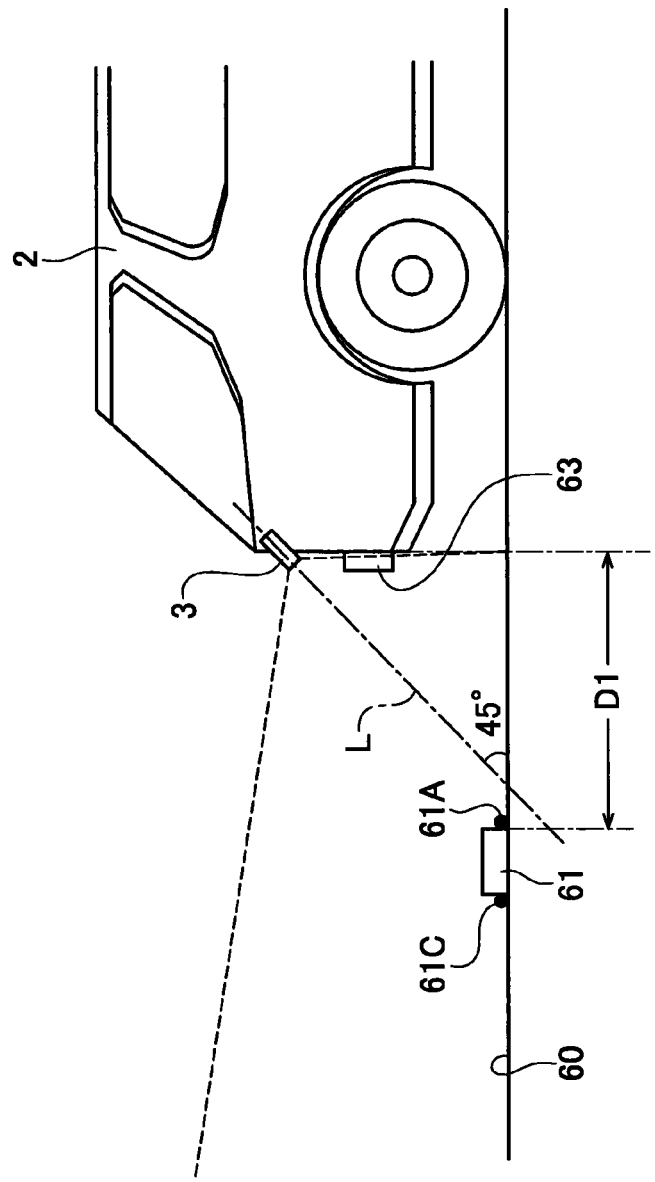
FIG. 6 is a side view which shows the vehicle when an image of a road marking is acquired.
Figure 7:
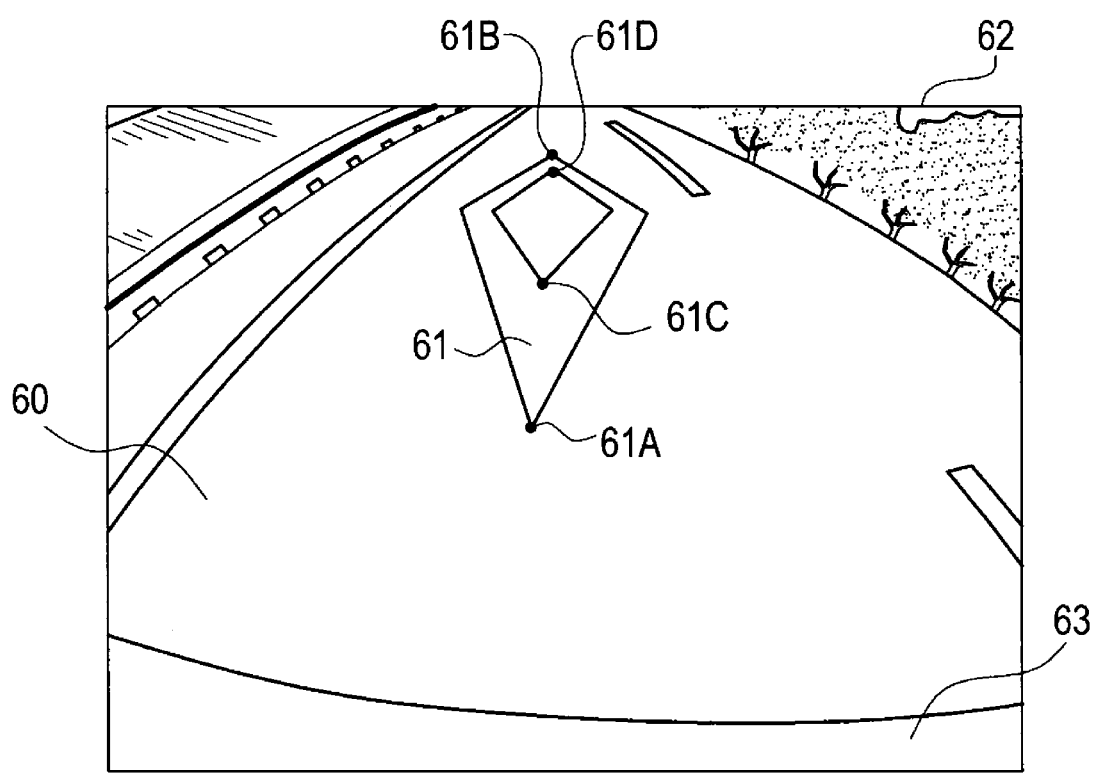
FIG. 7 is a schematic diagram which shows an image acquired by a rear-side camera mounted on the vehicle in the state shown in FIG. 5 and FIG. 6.

In the following specific example, let us say that, among the road markings formed on the surface of the road 60 on which the vehicle 2 is traveling, in particular, the rear-side camera 3 acquires an image of a road marking 61, i.e., "pedestrian crossing ahead", which is associated with a road marking 69, i.e., a stop line, which is set to be a control target. FIG. 5 is a top view which shows the vehicle 2 when an image of the road marking 61 is acquired. FIG. 6 is a side view which shows the vehicle 2 when an image of the road marking 61 is acquired. FIG. 7 is a schematic diagram which shows an image 62 acquired by the rear-side camera 3 mounted on the vehicle 2 in the state shown in FIG. 5 and FIG. 6.

As show in FIG. 6, the rear-side camera 3 is mounted in the vicinity of a rear bumper 63 of the vehicle 2 such that it can acquire an image of the view rearward from the vehicle 2 with the optical axis L thereof directed downwards at a 45 degree angle from the horizontal plane, thereby setting a fixed field of view for image acquisition. Accordingly, the distance between the vehicle 2 and a subject can be calculated based upon the position of the image data in the image shown in FIG. 7 acquired by means of the rear-side camera 3 (specifically, the number of pixels to the subject from the lower edge of the image).

Here, multiple positions are defined as the measurement start points for each road marking, which are used for measuring the distance between the vehicle 2 and the road marking. With such an arrangement, the distance between the vehicle 2 and the road marking closest to the vehicle 2 along the forward direction is defined as the distance between the vehicle 2 and the road marking. For example, FIG. 8A is a schematic diagram which shows measurement start points 61A through 61D for the road marking 61, i.e., a "pedestrian crossing ahead" marking. FIG. 8B is a schematic diagram which shows measurement start points 65A through 65D for the road marking 65, i.e., a "maximum speed (20 km/h)" marking.

As shown in FIGS. 8A and 8B, multiple measurement start points are defined for each road marking, each of which is positioned at a corner or a point on the edge of a line (boundary line) forming the road marking. The measurement start points are defined in a unique pattern for each road marking. With such an arrangement, when an image of a road marking is acquired, the navigation ECU 6 identifies the boundary line of the road marking and the measurement start points, which allows the type of road marking to be determined.

With such an arrangement, the distance D1 between the vehicle 2 and the measurement start point can be calculated based upon the position of the measurement start point (specifically, the number of pixels to the measurement start point from the lower edge of the image) in the image of the road marking thus acquired, as shown in FIG. 7. Here, the measurement start point, which is to be used for calculating the distance between the vehicle 2 and the road marking, is selected beforehand from among the multiple measurement points for each road marking. For example, with regard to the road marking 61, i.e., a "pedestrian crossing ahead" marking, shown in FIG. 8A, the distance between the vehicle 2 and the measurement start point 61A is calculated. It should be noted that, in a case in which the particular measurement start point 61A cannot be detected for some reason (e.g., in a state in which part of a white line is obscured by obstructions such as grit, puddles, etc., or in a case in which part of the paint that forms the white line has worn off due to many years of use), in the first stage, the distance between the vehicle and the measurement start point 61B is calculated. Then, the distance between the vehicle 2 and the measurement start point 61A is indirectly calculated based upon the distance between the measurement start point 61A and the measurement start point 61B. Furthermore, in a case in which the measurement start point 61B also cannot be detected, the measurement start point 61C is used. Moreover, in a case in which the measurement start point 61C also cannot be detected, the measurement start point 61D is used.

With regard to the road marking 65, i.e., the "Maximum Speed (20 km/h)" marking, shown in FIG. 8B, the distance between the vehicle 2 and the measurement start point 65A, and the distance between the vehicle 2 and the measurement start point 65B, are calculated. It should be noted that, in a case in which the particular measurement start points 61A and 65B cannot be detected for some reason (e.g., in a state in which part of a white line is obscured by obstructions such as grit, puddles, etc., or in a case in which part of the paint that forms the white line has worn off due to many years of use), the distance between the vehicle 2 and the measurement start point 65A, and the distance between the vehicle 2 and the measurement start point 65B, are indirectly calculated using the measurement start points 65C and 65D.

With such an arrangement, after the distance D1 between the vehicle 2 and the measurement start point of the road marking is calculated using the above-described method, the distance (target-vehicle distance) along the road between the vehicle 2 and the control target (see FIG. 3) associated with the road marking thus detected can be calculated based upon the distance D1 thus calculated. FIG. 9 is a schematic diagram for describing the calculation method for calculating the target-vehicle distance between the vehicle 2 and the control target after an image of the road marking is acquired by means of the rear-side camera mounted on the vehicle 2.

FIG. 9 shows an example in which the vehicle 2 detects the road marking 61, i.e., the "pedestrian crossing ahead" marking, by means of the rear-side camera 3. In this example, the road marking 61 is associated with the road marking 69, i.e., the "stop line" which is positioned the marking-target distance "M" forward of the road marking 61.

With such an arrangement, the distance D1 and the vehicle length D2 are subtracted from the marking-target distance M, thereby calculating the target-vehicle distance T (=M−D1−D2) between the vehicle 2 and the control target at the point in time when the road marking 61 was detected. Furthermore, the navigation ECU 6 calculates the traveling distance S of the vehicle 2 using the speed sensor 35 based upon the vehicle speed pulses generated by the engine at predetermined constant intervals of the distance traveled. Then, the distance traveled S is subtracted from the marking-vehicle distance T between the vehicle 2 and the control target thus obtained at the point in time when the road marking 61 was detected, thereby calculating the marking-vehicle distance T (=M−D1−D2−S) between the vehicle 2 and the control target while the vehicle is traveling. Such an arrangement performs vehicle control and guidance based upon the marking-vehicle distance T thus calculated between the vehicle 2 and the road marking 69, i.e., the stop line.

Next, description will be made with reference to FIG. 10 and FIG. 11 regarding the guidance and the vehicle control with respect to the control target according to the embodiment in a case in which there are multiple control targets associated with a road marking detected by the vehicle 2 by means of the rear-side camera 3 of the vehicle 2.

Figure 10:
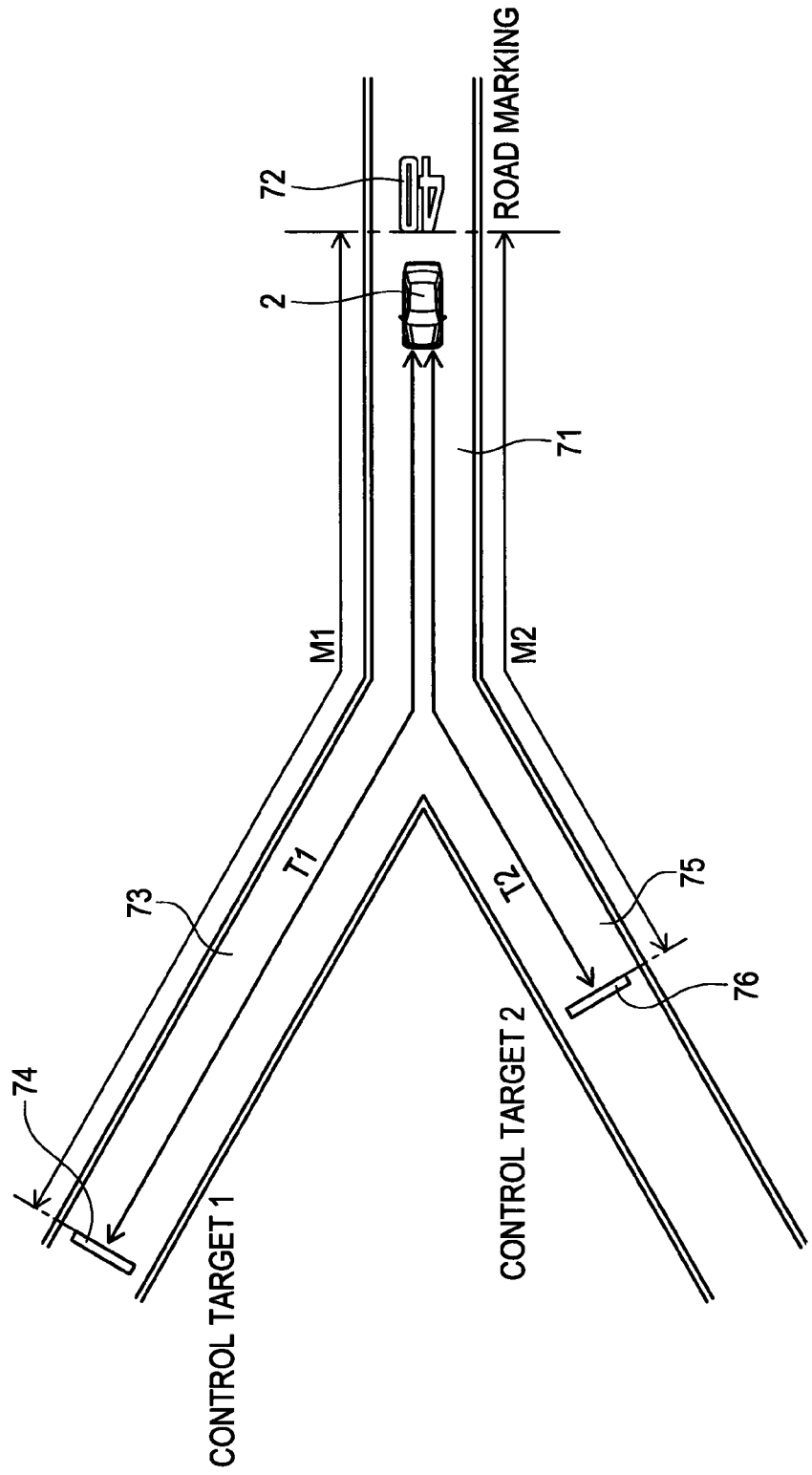
FIG. 10 is a schematic diagram which shows a case in which there are multiple control targets associated with a road marking detected by the vehicle, and the guidance and the vehicle control are performed for a particular control target.
Figure 11:
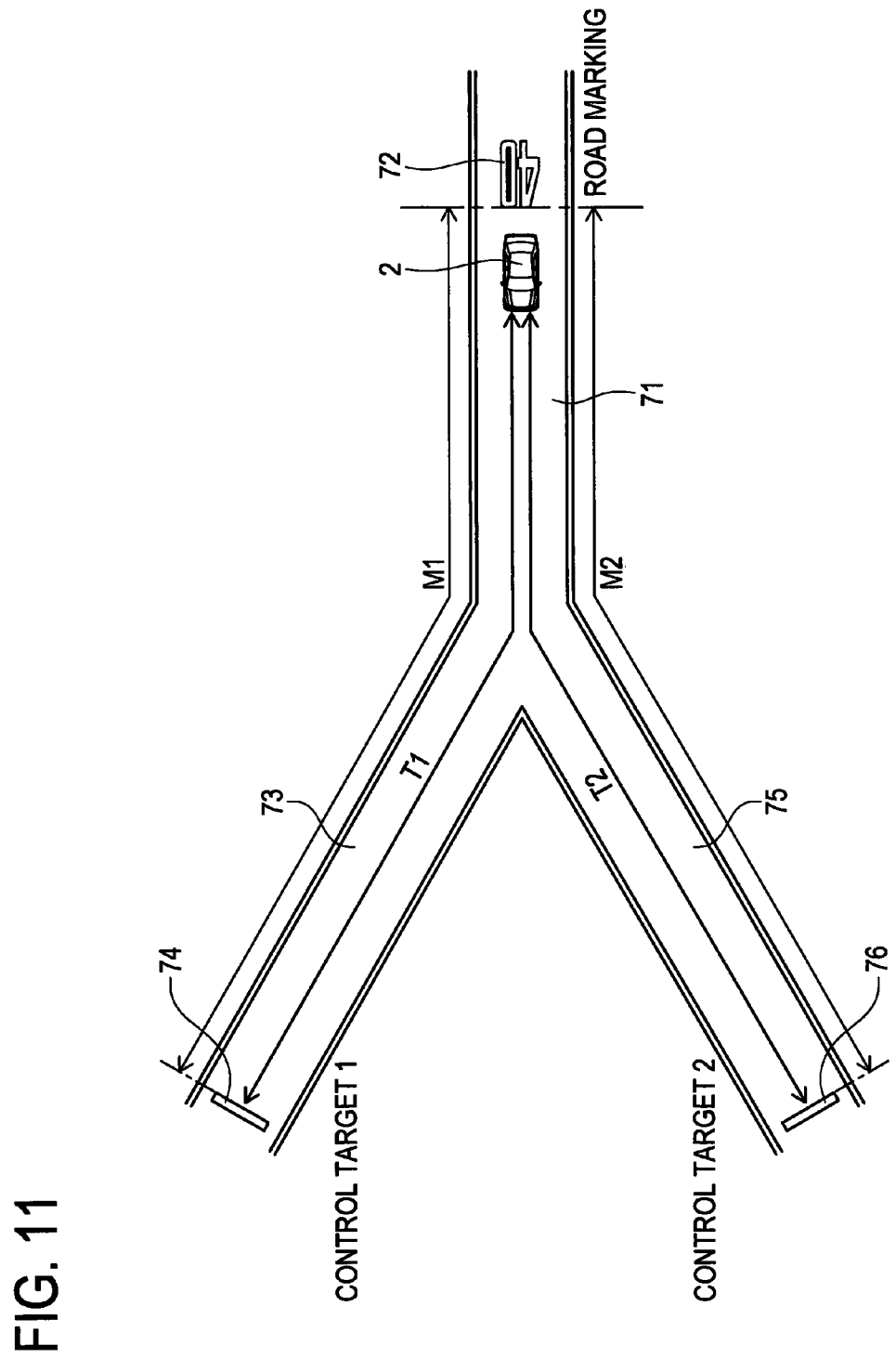
FIG. 11 is a schematic diagram which shows a case in which there are multiple control targets associated with a road marking detected by the vehicle, and the guidance and the vehicle control are not performed for any control target.

FIG. 10 and FIG. 11 show a case in which the vehicle 2 travels on a road 71 that diverges. Furthermore, a road marking 72 which has been formed on the road surface of the road 71 and which indicates "Maximum Speed 40 km/h" is associated with two control targets, i.e., a first stop line 74 formed on the road surface of a first branch road 73 and a second stop line 76 formed on the road surface of another second branch road 75. In this case, before the vehicle 2 passes through the divergence in the road, determination cannot be made with respect to which branch road the vehicle 2 will enter. Accordingly, before the vehicle 2 passes through the divergence in the road, determination cannot be made whether guidance and vehicle control should be made with respect to the first stop line 74 or the second stop line 76, which is a problem.

With the driving assistance apparatus 1 according to the present embodiment, before the vehicle 2 passes through the divergence in the road, a notice provision operation and a vehicle control are performed with respect to the control target positioned at a shorter distance along the road between the vehicle 2 and the control target. Accordingly, comparison is made between the marking-target distances between the road marking and the respective control targets stored in the road marking DB 42 (see FIG. 3), and guidance and vehicle control are performed with respect to the control target positioned at a shorter distance between the road marking and the control target before the vehicle passes through the divergence in the road. However, in a case in which there is almost no difference between the marking-target distances, determination cannot be made with respect to which control target is positioned at a shorter traveling distance of the vehicle 2 to reach the control target. Accordingly, such an arrangement performs neither guidance nor a vehicle control for any control target before the vehicle 2 passes through the divergence in the road.

Specifically, as shown in FIG. 10 and FIG. 11, when the vehicle 2 detects the road marking 72 while the vehicle is traveling by means of the rear-side camera, the vehicle 2 acquires from the road marking DB 42 the first marking-target distance M1 which is the marking-target distance between the road marking 72 and the first stop line 74, and the second marking-target distance M2 which is the marking-target distance between the road marking 72 and the second stop line 76, and calculates the distance difference there between.

In a case in which the difference between the first marking-target distance M1 and the second marking-target distance M2 thus calculated is equal to or greater than a control threshold distance (e.g., 5 m) as shown in FIG. 10, the vehicle 2 can identify with high precision the control target (the second stop line 76 in FIG. 10) positioned at a shorter traveling distance of the vehicle 2 to reach the control target. Accordingly, before the vehicle 2 passes through the divergence in the road, the second stop line 76 is set to be the target control target, and guidance and vehicle control are performed based upon the second target-vehicle distance T2, which is the distance between the vehicle 2 and the second stop line 76. After the vehicle 2 passes through the divergence in the road, the guidance and the vehicle control are performed with respect to the control target formed on the surface of the road on which the vehicle is traveling. That is to say, in a case in which the vehicle 2 enters the first branch road 73 at the divergence in the road, the target control target is switched to be the first stop line 74, and the guidance and the vehicle control are performed based upon the first target-vehicle distance T1 between the vehicle 2 and the first stop line 74. On the other hand, in a case in which the vehicle 2 enters the second branch road 75 at the divergence in the road, the guidance and the vehicle control with respect to the second stop line 76 are maintained.

On the other hand, in a case in which the difference between the first marking-target distance M1 and the second marking-target distance M2 thus calculated is smaller than the control threshold distance (e.g., 5 m) as shown in FIG. 11, the vehicle 2 cannot identify with high precision the control target positioned at a shorter traveling distance of the vehicle 2 to reach the control target. Accordingly, in this case, the guidance and the vehicle control are performed with neither the first stop line 74 nor the second stop line 76 as the control target before the vehicle 2 passes through the divergence in the road. It should be noted that, after the vehicle 2 passes through the divergence in the road, the vehicle 2 performs the guidance and the vehicle control for the control target formed on the surface of the road on which the vehicle 2 is traveling, in the same manner as FIG. 10. That is to say, in a case in which the vehicle 2 enters the first branch road 73 at the divergence in the road, the target control target is switched to the first stop line 74, and the guidance and the vehicle control are performed based upon the first target-vehicle distance T1, which is the distance between the vehicle 2 and the first stop line 74. On the other hand, in a case in which the vehicle 2 enters the second branch road 75 at the divergence in the road, the guidance and the vehicle control are performed for the second stop line 76.

It should be noted that, in a case in which there is a curve in the road on the surface of which the road marking or the control target has been formed, the marking-vehicle distance is calculated along the curve in the road. Also, in a case in which there is an ascending slope or a descending slope in the road on the surface of which the road marking or the control target has been formed, the marking-vehicle distance is calculated along the grade of the slope.

As described above, instead of directly identifying the control target, the target-vehicle distance between the vehicle 2 and the control target positioned forward of the vehicle 2 is indirectly calculated based upon the road marking detected by the rear-side camera 3. Such an arrangement allows the target-vehicle distance (T=M−D1−D2−S) between the vehicle 2 and the control target to be calculated with high precision at an earlier stage. Thus, such an arrangement provides appropriate vehicle control and driving guidance at a more appropriate timing based upon the precise target-vehicle distance between the vehicle 2 and the control target.

Figure 12:
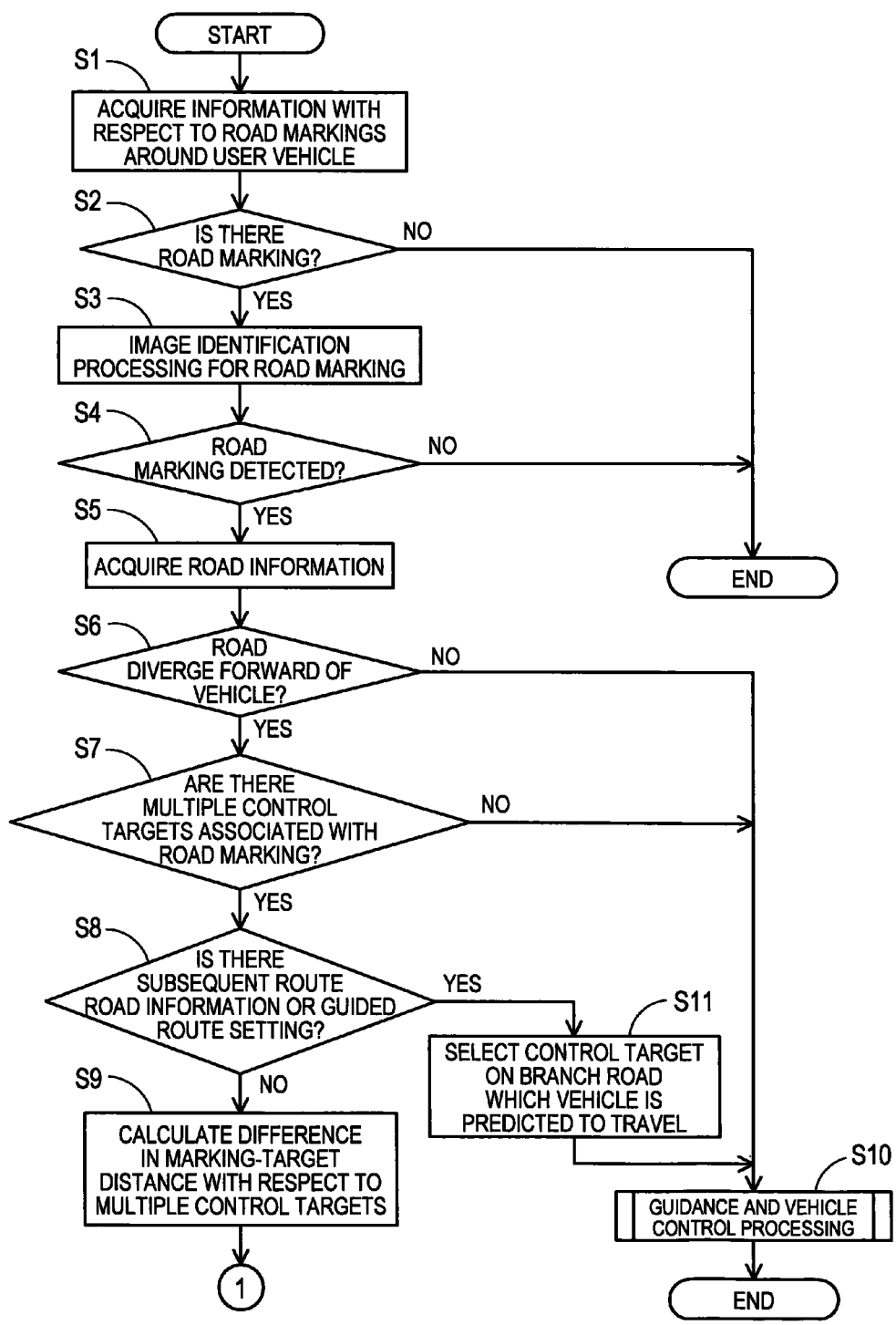
FIG. 12 is a flowchart which shows a driving assistance processing program executed by the driving assistance apparatus according to the present embodiment.
Figure 13:
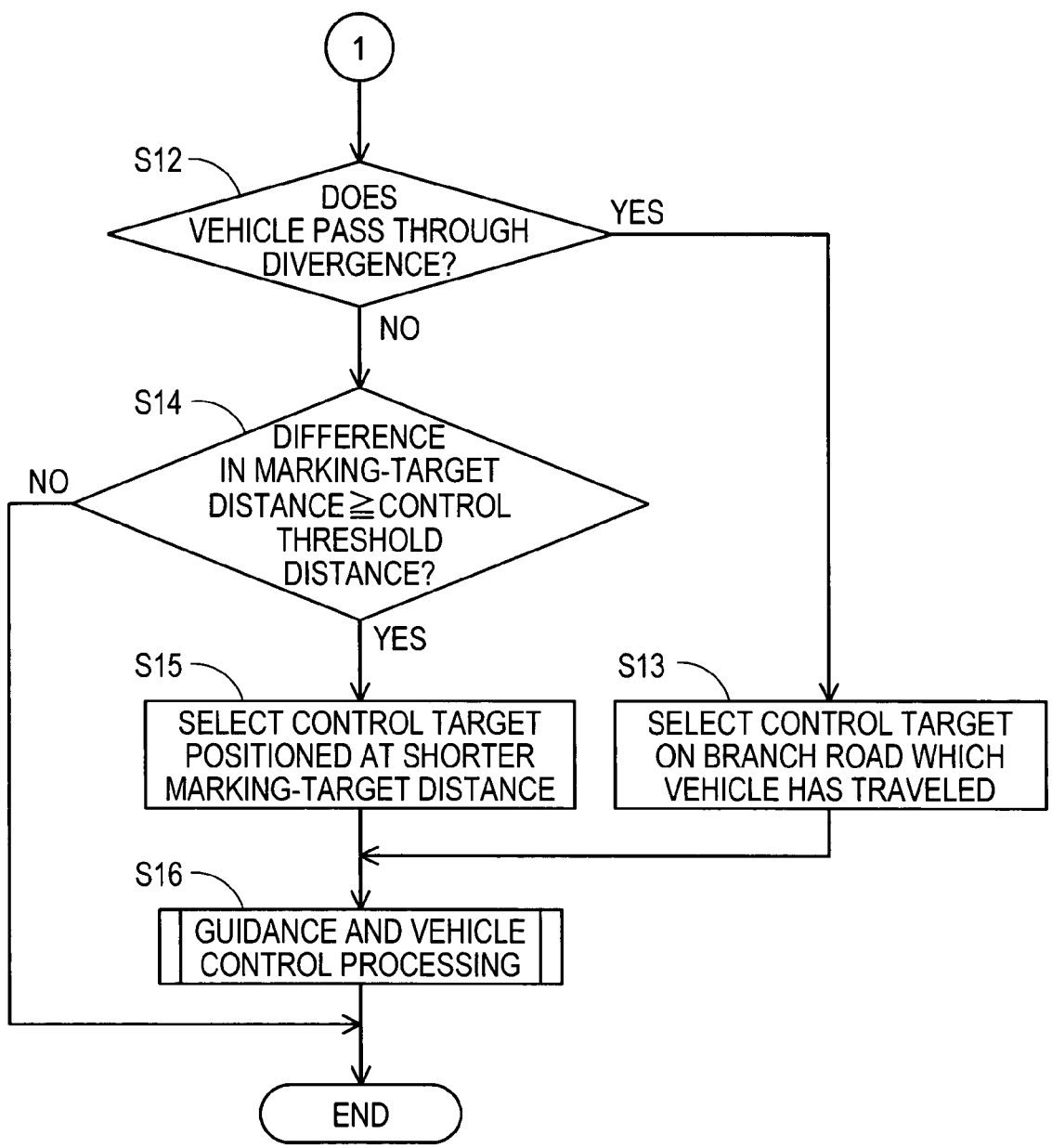
FIG. 13 is a flowchart which shows a driving assistance processing program executed by the driving assistance apparatus according to the present embodiment.
Figure 14:
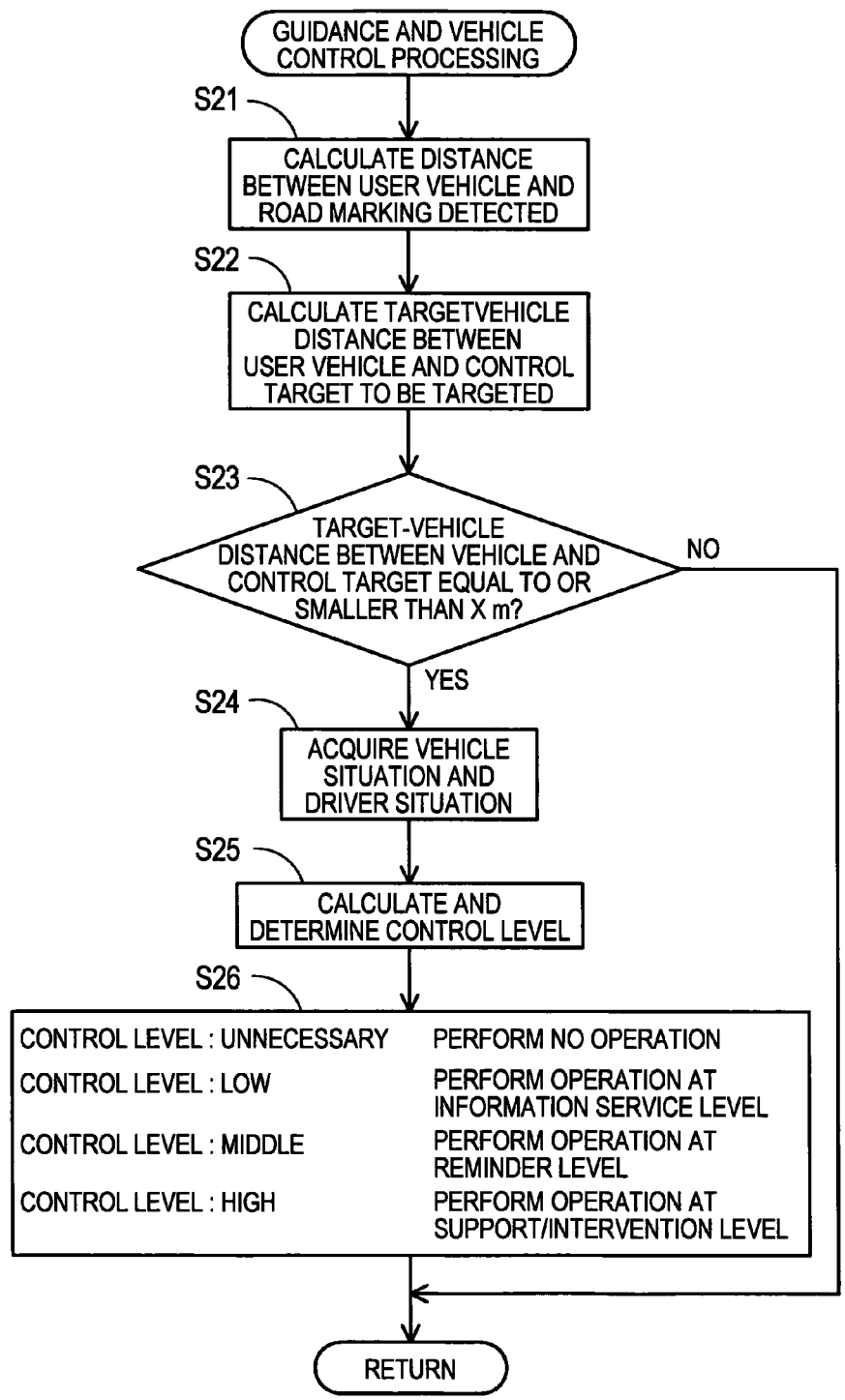
FIG. 14 is a flowchart for describing the guidance and the vehicle control processing performed by the driving assistance apparatus according to the present embodiment.

Subsequently, description will be made with reference to FIG. 12 and FIG. 13 regarding a driving assistance processing program executed by the navigation ECU 6 included in the driving assistance apparatus 1 having the above-described configuration according to the present embodiment. FIG. 12 and FIG. 13 are flowcharts which show a driving assistance processing program executed by the driving assistance apparatus 1 according to the present embodiment. Here, the driving assistance processing program is executed at predetermined intervals (e.g., at intervals of 200 ms) after the vehicle ignition is switched on. The driving assistance processing program instructs the navigation ECU 6 to detect road markings based upon images acquired by means of the rear-side camera 3 when the vehicle 2 is traveling on a road. In a case in which a predetermined condition has been satisfied, the driving assistance processing program instructs the navigation ECU 6 to calculate the target-vehicle distance between the vehicle and the control target based upon the road marking thus detected, and to perform control based upon the target-vehicle distance thus calculated, thereby assisting the user to drive the vehicle 2. It should be noted that the program represented by the flowcharts shown in FIG. 12 through FIG. 14 is stored in ROM or RAM included in the navigation ECU 6, and is executed by a CPU.

With the driving assistance processing program, in Step (hereafter abbreviated to "S") 1, the navigation ECU 6 reads out the information with respect to the road markings (the position coordinate data of the road markings, the type of road markings, control targets associated with each road marking, the marking-target distance between the road marking and each control target) in the vicinity of the vehicle 2 (with the present embodiment, the road markings positioned in a range between 2,000 m forward of and 500 m behind the vehicle 2) from the road marking DB 42 based upon the current position information of the vehicle 2 detected by the current position detection unit 9 and the position information with respect to the road markings stored in the road marking DB 42 (see FIG. 3). It should be noted that the aforementioned S1 corresponds to the processing performed by the marking-target distance acquisition section.

Subsequently, in S2, the navigation ECU 6 determines whether or not there is a particular road marking positioned in a predetermined range with respect to the vehicle 2 (in a range between 30 m forward of and 20 m behind the vehicle 2) among the road markings read out in the aforementioned S1. In a case in which determination has been made that there is a road marking positioned within the predetermined range with respect to the vehicle 2 (in a case of "YES" in S2), the flow proceeds to S3 where the navigation ECU 6 performs image identification processing for identifying the road marking. On the other hand, in a case in which determination has been made that there is no road marking positioned within the predetermined range with respect to the vehicle 2 (in a case of "NO" in S2), the driving assistance processing program ends. After a predetermined period of time, the navigation ECU 6 again reads out the information with respect to the road markings based upon the current position.

In the image identification processing of the road marking in S3, the navigation ECU 6 acquires an image of the rearward view from the vehicle 2 acquired by means of the rear-side camera 3 so as to perform analysis processing. In the analysis processing, the navigation ECU 6 identifies the boundary line and the measurement start points of a road marking formed on the surface of the road on which the vehicle is traveling, and determines the type of road marking thus detected.

Specifically, first, the image acquired by the rear-side camera 3 is input via an analog communication means such as NTSC or a digital communication means such as i-link, and the input image thus input is converted to a digital image format such as jpeg, mpeg, or the like. Next, using the fact that each road marking is generally formed of white lines or yellow lines, the navigation ECU 6 performs brightness correction for the road surface on which the road marking is depicted and the other road surface in the image thus acquired based upon the brightness difference. Subsequently, the navigation ECU 6 detects the boundary line of the road marking formed on the surface of the road and the measurement start points by performing binary value processing for extracting the target road marking from the image, shaping processing for correcting distortion, smoothing processing for removing noise in the image, etc.

Subsequently, the navigation ECU 6 identifies the type of road marking in the acquired image based upon the boundary line and the layout of the measurement start points thus detected. Furthermore, the navigation ECU 6 determines whether or not the type of road marking thus identified matches the type of road marking thus determined in the aforementioned S2 to be within the predetermined range from the user vehicle. It should be noted that the above-described S3 corresponds to the processing executed by the road marking detection section.

Then, in S4, determination is made whether or not a road marking has been detected in the aforementioned S3. In a case in which determination has been made that a road marking has been detected (in a case of "YES" in S4), i.e., in a case in which a road marking has been identified in the image thus acquired, and the type of road marking thus identified matches the type of road marking determined in the aforementioned S2 that it is positioned around the user vehicle, the flow proceeds to S5. On the other hand, in a case in which determination has been made that a road marking has not been detected (in a case of "NO" in S4), i.e., in a case in which no road markings have been identified in the acquired image, or in a case in which the type of road marking thus identified does not match the type of road marking determined in the aforementioned S2 to be positioned in the vicinity of the user vehicle, the driving assistance processing program ends. After a predetermined period of time, the navigation ECU 6 again reads out the information with respect to the road markings based upon the current position.

Subsequently, in S5, the navigation ECU 6 acquires the road information from the map DB 41 with respect to the roads in the vicinity of the current traveling position of the vehicle 2.

Furthermore, in S6, the navigation ECU 6 determines whether or not the road diverges in the direction forward of the vehicle 2 based upon the road information acquired in the aforementioned S5. It should be noted that the aforementioned S6 corresponds to the processing performed by the divergence determination section.

In a case in which determination has been made that the road diverges in the direction forward of the vehicle 2 (in a case of "YES" in S6), determination is further made based upon the road marking information acquired in the aforementioned S1 whether or not there are multiple control targets associated with the road marking thus detected in the aforementioned S3, i.e., whether or not there are at least two control targets formed on the multiple branch roads (S7). It should be noted that the aforementioned S7 corresponds to the processing performed by the control target count determination section.

In a case in which determination has been made that there are multiple control targets associated with the road marking thus detected in the aforementioned S3 (in a case of "YES" in S7), determination is further made based upon the road information acquired in the aforementioned S5 whether or not the navigation ECU 6 has acquired information with respect to a subsequent route branch road extending along the road on which the vehicle 2 is traveling, i.e., whether or not, among the multiple branch roads, there is a branch road extending along the current road on which the vehicle 2 is being driven, and whether or not, among the multiple branch roads, there is a branch road that has been set to be a guided road (S8). It should be noted that the aforementioned S8 corresponds to the processing performed by the subsequent route road determination section and the guided route determination section.

In a case in which determination has been made that neither the information with respect to a subsequent route branch road nor a guided road has been set (in a case of "NO" in S8) in the aforementioned determination step, the flow proceeds to S9.

On the other hand, in a case in which determination has been made in the aforementioned S6 that the road does not diverge in the direction forward of the vehicle 2 (in a case of "NO" in S6), or in a case in which determination has been made in the aforementioned S7 that the road marking is associated with only a single control target (in a case of "NO" in S7), guidance and vehicle control are performed with respect to the control target associated with the road marking thus detected (S10). It should be noted that detailed description will be made later with reference to FIG. 14 regarding the guidance with respect to the specific content of the control target and the vehicle control processing performed in S10.

In a case in which determination has been made in the aforementioned S8 that either information with respect to a subsequent route branch road or a guided road have been set (in a case of "YES" in S8), the control target formed on a particular branch road set to the subsequent route branch road or the guided road is selected as the control target (S11). Then, guidance and vehicle control described later are performed with respect to the control target thus selected (S10).

Next, in S9, the navigation ECU 6 calculates the difference in the marking-target distance, which is the distance between the road marking and each of the multiple control targets associated with the road marking thus detected in the aforementioned S3. It should be noted that, in a case in which there are three or more control targets associated with the road marking, the navigation ECU 6 selects the two control targets for which the differences in the marking-target distance exhibit the smallest values, and the difference in the marking-target distance is calculated using the two control targets thus selected. Subsequently, the flow precedes S12.

In S12, the navigation ECU 6 determines whether or not the vehicle 2 has passed through the divergence in the road along the forward direction. In a case in which determination has been made that the vehicle 2 has passed through the divergence in the road (in a case of "YES" in S12), the navigation ECU 6 selects the control target formed on the branch road which the vehicle 2 has entered (S13). Then, the navigation ECU 6 performs guidance and vehicle control described later with respect to the control target thus selected (S16).

On the other hand, in a case in which determination has been made that the vehicle has not passed through the divergence in the road (in a case of "NO" in S12), determination is further made whether or not the difference in the marking-target distance thus calculated in the aforementioned in S9 is equal to or greater than a control threshold distance (e.g., 5 m) (S14). In a case in which determination has been made that the difference in the marking-target distance is equal to or greater than the control threshold distance (in a case of "YES" in S14), the navigation ECU 6 can identify the control target positioned at a shorter traveling distance of the vehicle 2 to reach the control target. In this case, the flow proceeds to Step S15.

In S15, the navigation ECU 6 selects the control target positioned at the shortest marking-target distance from among the multiple control targets associated with the road marking thus detected (S15). Then, the navigation ECU 6 performs guidance and vehicle control with respect to the control target thus selected (S16), as described later.

On the other hand, in a case in which determination has been made that the difference in the marking-target distance is smaller than the control threshold distance (in a case of "NO" in S14), the navigation ECU 6 cannot identify the control target positioned at a shorter traveling distance of the vehicle 2 to reach the control target. Accordingly, the navigation ECU 6 performs neither guidance nor vehicle control with respect to the control target before the vehicle 2 passes through the divergence in the road.

Next, description will be made with reference to FIG. 14 regarding the guidance and the vehicle control processing executed in the aforementioned S10 and S16. FIG. 14 is a flowchart for describing the guidance and the vehicle control processing performed by the driving assistance apparatus 1 according to the present embodiment.

First, in S21, the navigation ECU 6 calculates the distance between the vehicle 2 and the road marking detected in the aforementioned S3. Specifically, the navigation ECU 6 calculates the distance D1 between the vehicle 2 and a particular measurement start point, based upon the position of the measurement start point (specifically, the number of pixels between the measurement start point and the lower edge of the acquired image) identified in the acquired image (see FIG. 7) of the road marking.

Subsequently, in S22, the navigation ECU 6 calculates the target-vehicle distance T (=M−D1−D2) between the vehicle 2 and the control target at the point in time at which the road marking was detected, based upon the distance D1 between the vehicle 2 and the measurement start point thus calculated in the aforementioned S21, the marking-target distance M between the road marking and the control target selected as the target for guidance and vehicle control, and the vehicle length D2 (see FIG. 9).

Furthermore, in S22, the navigation ECU 6 calculates the traveling distance S of the vehicle 2 from the road marking detection point using the speed sensor 35 based upon the vehicle speed pulses generated by the engine at constant intervals of the traveling distance, and calculates the target-vehicle distance T (=M−D1−D2−S) between the current position of the vehicle 2 and the control target in the traveling state (see FIG. 9). It should be noted that the aforementioned S21 and S22 correspond to the processing performed by the target-vehicle distance calculation section.

Subsequently, in S23, determination is made based upon the target-vehicle target T between the vehicle 2 and the control target thus calculated in the aforementioned S22 whether or not the vehicle 2 has reached the guidance start point or the control start point set for each control target. For example, in a case in which the control target is a "stop line" or a "corner", when the target-vehicle distance becomes equal to or smaller than 50 m, determination is made that the vehicle has reached the guidance start point or the driving control start point. On the other hand, in a case in which the control target is an "intersection", which is also handled as a road marking, when the remaining distance becomes equal to or smaller than 10 m, determination is made that the vehicle 2 has reached the guidance start point or the driving control start point.

In a case in which determination has been made that the vehicle 2 has reached the guidance start point or the driving control start point (in a case of "YES" in S23), the navigation ECU 6 acquires the vehicle situation and the driver situation, based upon which determination is made whether or not there is a need to perform either guidance or vehicle control with respect to the control target (S24). Specifically, the navigation ECU 6 acquires the speed of the vehicle 2, the accelerator opening, the steering angle, the direction of the driver's face, the direction of the driver's eyes, etc.

Then, in S25, the navigation ECU 6 calculates and determines the control level, which is selected from among multiple levels based upon the vehicle situation and the driver situation thus acquired in the aforementioned S24, which represents the degree of necessity of performing vehicle control and providing guidance with respect to the control target.

With the present embodiment, as described with reference to FIG. 4, the required deceleration (force applied to the vehicle due to deceleration G) G1 with respect to the control target is calculated based upon the current speed and acceleration of the user vehicle. Then, the navigation ECU 6 determines the control level based upon the required deceleration thus calculated.

Subsequently, in S26, the navigation ECU 6 performs guidance and vehicle control according to the control level thus determined in the aforementioned S25.

(1) Specifically, as shown in FIG. 4, in a case in which the necessary deceleration G1 is smaller than 0.05 G, determination is made that the control level should be set to the "unnecessary level", whereupon neither the control nor the guidance is performed.

(2) In a case in which the necessary deceleration G1 is equal to or greater than 0.05 G and smaller than 0.1 G, determination is made that the control level should be set to the "low level", which is an information service level, whereupon only the guidance is provided. For example, in a case in which the vehicle is approaching a "stop line" or a "corner" set to be a control target, such an arrangement instructs the liquid crystal display 7 to display a mark which represents the stop line or the corner, thereby notifying the driver that the vehicle is approaching the stop line or the corner.

(3) In a case in which the necessary deceleration G1 is equal to or greater than 0.1 G and smaller than 0.3 G, determination is made that the control level should be set to the "middle level", whereupon only reminder-level guidance is provided. For example, in a case in which the vehicle is approaching a "stop line" or a "corner" set to be a control target, such an arrangement displays a character string "stop line (corner) ahead" on the liquid crystal display 7, or outputs a warning with respect to the same content in the form of voice guidance via the speaker 8, which is a warning that the vehicle is approaching the stop line or the corner.

(4) In a case in which the necessary deceleration G1 is greater than 0.3 G, determination is made that the control level should be set to the "high level", whereupon a vehicle control and guidance are performed at a support level or a intervention level. For example, in a case in which the vehicle is approaching a "stop line" or a "corner" set to be a control target, such an arrangement displays a character string "stop line (corner) ahead" on the liquid crystal display 7, and outputs a warning with respect to the same content in the form of voice guidance via the speaker 8, which is a warning that the vehicle is approaching the stop line or the corner. Furthermore, in a case in which this control target matches a "stop line", such an arrangement performs a deceleration control for the brake actuator 11 and the AT 13 such that the vehicle stops before the stop line. On the other hand, in a case in which this control target matches a "corner", such an arrangement performs a deceleration control for the brake actuator 11 and the AT 13 such that, before the vehicle enters the corner, the vehicle is being driven at an optimum speed for the R of the corner stored in the map DB 41 (e.g., 40 km/h for a curve at R=30).

It should be noted that, in a case in which the vehicle is approaching an "intersection" set to be a control target, such an arrangement does not perform the vehicle control. In this case, when the target-vehicle distance between the vehicle and the control target becomes a predetermined distance (e.g., 10 m), such an arrangement performs only the route guidance according to the guided route thus set. For example, in this case, such an arrangement displays a guidance image on the liquid crystal display 7, which notifies the driver that the vehicle should be turned left. Furthermore, such an arrangement outputs the voice guidance "Turn left at the next intersection," via the speaker 8.

On the other hand, in a case in which determination has been made that the vehicle 2 has not reached the guidance start point or the driving control start point (in a case of "NO" in S23), the processing ends without guidance or vehicle control being performed. It should be noted that the above-described S26 corresponds to the processing performed by the driving assistance section.

As described above in detail, with the driving assistance apparatus 1 according to the present embodiment, in a case in which determination has been made that there is a road marking within a predetermined range from the vehicle 2 (in a case of "YES" in S2), the road marking is detected from an image acquired by the rear-side camera 3 (S3). In a case in which there is a single control target solely associated with the road marking thus detected, or in a case in which there are multiple control targets associated with the road marking, and the difference in the marking-target distance is equal to or greater than a control threshold distance (in a case of "YES" in S14), the target-vehicle distance, which is the distance between the vehicle and the control target which is a target for guidance or vehicle control, is calculated (S21, S22). Then, guidance and vehicle control are performed according to the control target based upon the target-vehicle distance thus calculated (S26). Such an arrangement performs neither guidance nor vehicle control in a situation in which the navigation ECU 6 could provide useless guidance or perform false control in a case in which there are multiple control targets associated with the road marking detected by the vehicle 2. This ensures that suitable notices are provided and suitable vehicle control is performed with respect to the related control target for the driver. Furthermore, such an arrangement reduces the amount of calculation processing, thereby reducing the processing load of the navigation ECU 6.

Furthermore, in a case in which the vehicle 2 travels along a road that diverges ahead, and there are multiple control targets formed on the respective branch roads associated with a road marking detected by the vehicle 2, the navigation ECU 6 performs neither guidance nor vehicle control in a situation in which the navigation ECU 6 could provide useless guidance or perform false control. Thus, such an arrangement ensures that suitable guidance and vehicle control are performed with respect to the control target formed on the correct branch road on which the vehicle 2 travels.

Moreover, in a case in which the vehicle 2 travels along a road that diverges ahead, and there are multiple control targets formed on the respective branch roads associated with a road marking detected by the vehicle 2, the navigation ECU 6 performs neither guidance nor vehicle driving control with respect to the control target in a situation in which the navigation ECU 6 could provide useless guidance or perform false driving control before the vehicle 2 reaches the divergence in the road. Thus, such an arrangement eliminates the danger of confusing the driver.

In a case in which there is a subsequent route road relation between the current road and a branch road forward of the current road (in a case of "YES" in S8), a prediction is made that the vehicle will travel along the branch road having the subsequent route road relation. Then, notice is provided and vehicle control is performed with respect to the control target formed on the road which the vehicle is predicted to travel. Thus, such an arrangement prevents useless guidance from being provided and false control from being performed.

In a case in which a particular branch road is set to be a guided route (in a case of "YES" in S8), a prediction is made that the vehicle will travel on the branch road set to be the guided route. Then, notice is provided and vehicle control is performed with respect to the control target formed on the road which the vehicle is predicted to travel. Thus, such an arrangement prevents useless guidance from being provided and false driving control from being performed in the same way as describe above.

Furthermore, guidance and vehicle control are performed based upon the target-vehicle distance, which is the distance between the vehicle and the control target. Such an arrangement ensures that suitable guidance is provided and suitable vehicle control are performed according to the type of control target without involving high-cost devices such as image acquisition devices being employed as a front camera for acquiring images of subjects far from the vehicle.

It should be noted that the present invention is not restricted to the above-described embodiment. Rather, it is needless to say that various modifications and changes may be made without departing from the scope of the present invention.

For example, description has been made in the present embodiment regarding an arrangement in which the control target is a stop line, an intersection, and an entrance to a curve. However, the present invention is not restricted to such an arrangement. For example, road markings such as pedestrian crossings, etc., and facilities such as interchanges, etc., may be set to be the control targets.

Description has been made in the present embodiment regarding an arrangement in which the required deceleration (force applied to the vehicle due to deceleration G) G1 with respect to the control target is calculated based upon the current speed and acceleration of the user vehicle, and the control level is determined based upon the required deceleration thus calculated. Also, an arrangement may be made in which the control level is determined based upon the direction of the driver's face or the direction of the driver's eyes. Specifically, in a case in which the driver is not looking forward at the point in time at which the vehicle 2 reaches the guidance start point or the control start point, determination is made that the control level should be set to the "high" level. On the other hand, in a case in which the driver is looking forward at this point in time, determination may be made that the control level should be set to the "unnecessary" level.

Description has been made in the present embodiment regarding the driving assistance apparatus 1 including the rear-side camera 3 which serves as an image acquisition section for acquiring an image of the view rearward from the vehicle 2. Furthermore, description has been made regarding an arrangement in which a road marking is identified based upon an image acquired by the rear-side camera, and control are performed with respect to a control target. Also, an arrangement may be made including a front-side camera as an image acquisition section for acquiring an image of the view forward from the vehicle 2, in addition to the rear-side camera 3, and a road marking is identified based upon an image acquired by the front-side camera, in addition to an image acquired by the rear-side camera 3.

Figure 15:
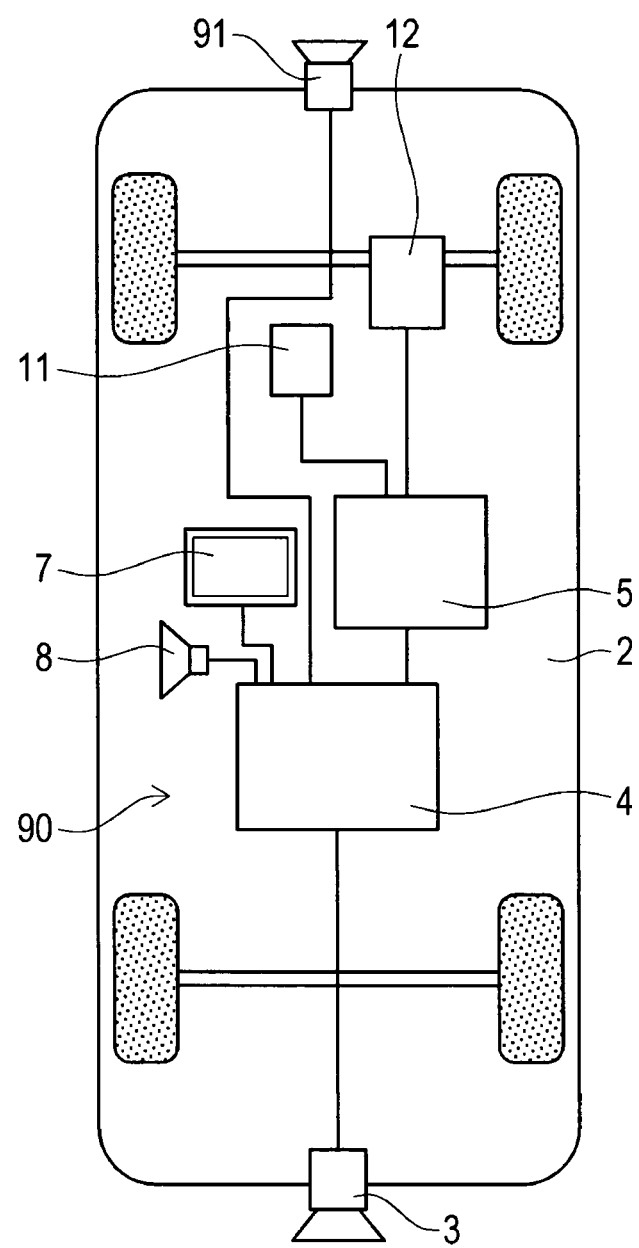
FIG. 15 is a schematic configuration diagram which shows a driving assistance apparatus according to another embodiment.
Figure 16:
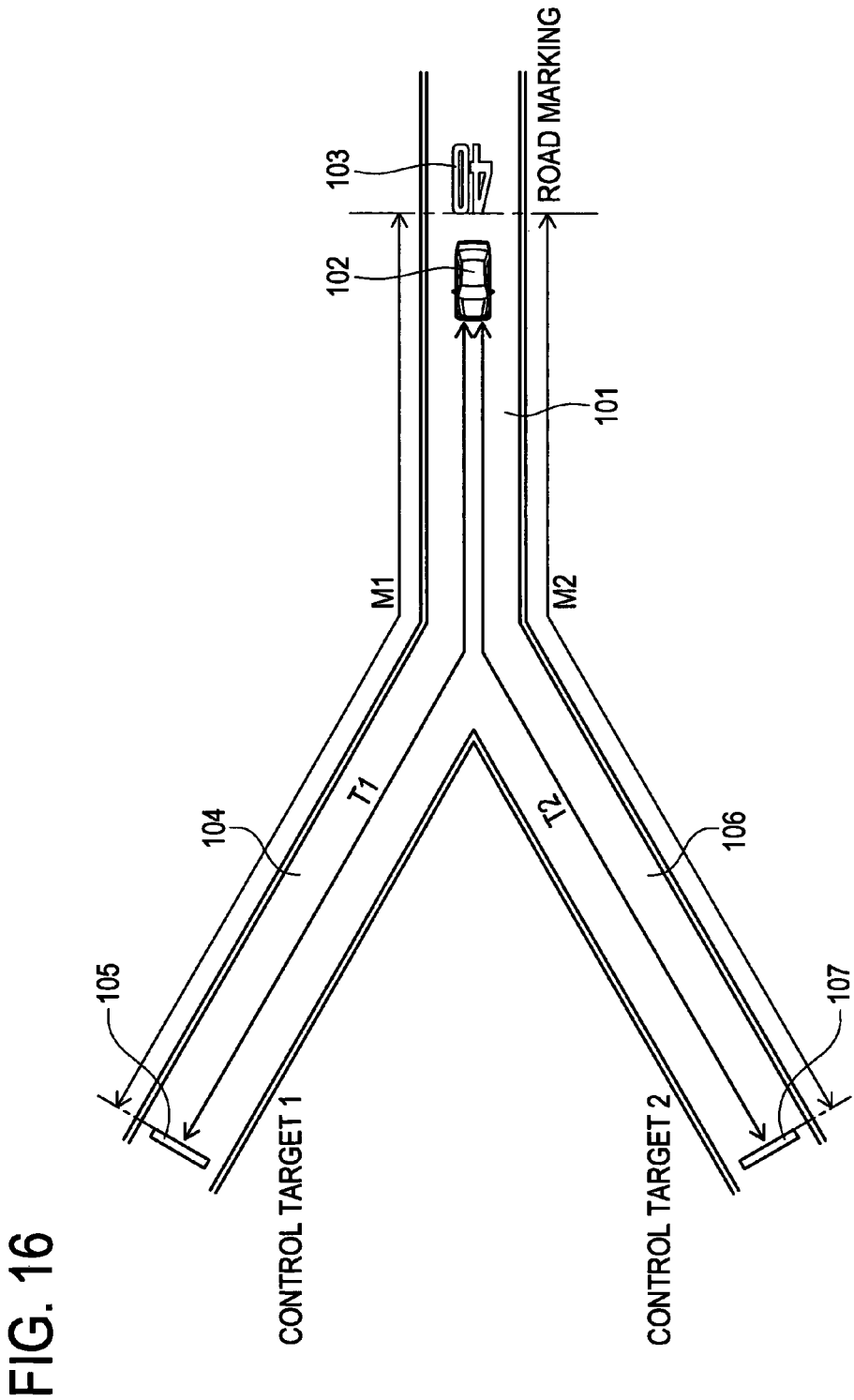
FIG. 16 is an explanatory diagram for describing the problem in conventional techniques.

Here, FIG. 15 is a schematic configuration diagram which shows a driving assistance apparatus 90 according to another embodiment.

As shown in FIG. 15, the driving assistance apparatus 90 according to such an other embodiment has a configuration including a front-side camera 91 mounted on the vehicle 2, the rear-side camera 3, the navigation apparatus 4, the vehicle ECU 5, and so forth. It should be noted that the components other than the front-side camera 91, i.e., the rear-side camera 3, the navigation apparatus 4, and the vehicle ECU 5 are the same as those of the driving assistance apparatus 1 according to the aforementioned embodiment, and accordingly, description thereof will be omitted.

The driving assistance apparatus 90 according to such an other embodiment provides an increase in the types of available control targets and improved detection efficiency with respect to the detection of the road markings based on the image acquired by the front-side camera, which will be described below.

For example, with such an arrangement, in a case in which determination has been made based upon an image acquired by the front-side camera 91 that there is a red light signal at an intersection forward of the vehicle, a warning can be provided that there is a red light signal at the intersection, in addition to the guidance and vehicle control (S26) according to the intersection, which is a control target as described above. Furthermore, in this case, such an arrangement allows the brake actuator 11 and the AT 13 to be controlled such that the vehicle 2 stops before the intersection.

Also, with such an arrangement, in a case in which determination has been made based upon an image acquired by the front-side camera 91 that there is a brief stop sign at an intersection forward of the vehicle 2, a warning can be provided with respect to the brief stop sign, in addition to the guidance and vehicle control (S26) according to the intersection, which is a control target as described above. Furthermore, in this case, such an arrangement allows the brake actuator 11 and the AT 13 to be controlled such that the vehicle 2 stops before the intersection.

Also, an arrangement may be made in which, in a case in which determination has been made based upon an image acquired by the front-side camera 91 that there is a road marking on the road forward of the vehicle 2, the timing at which the vehicle 2 will pass over the road marking is acquired, and identification processing is performed on an image acquired by the rear-side camera 3 based upon the timing thus calculated. Such an arrangement improves the detection efficiency with respect to the detection of the road markings even if a camera having a narrow field of view is employed as the rear-side camera 3.

The invention claimed is:

1. A driving assistance apparatus comprising:
   a marking information storage section which stores position information with respect to road markings formed on a road, with the position of each road marking being stored associated with at least one marking-target distance which is the distance along the road between the road marking and a control target, a particular road marking having more than one associated control target when each associated control target for that particular road marking is located on a different branch road from the road on which the road marking is located;
   an image acquisition section which is mounted on the vehicle, and which acquires an image of the vehicle's surroundings;
   a road marking detection section which detects, based upon an image acquired by the image acquisition section, a road marking formed on the road on which the vehicle is traveling;
   a road information storage section which stores information with respect to the road;
   a road divergence determination section which determines, based upon the road information, whether or not the road diverges forward of the vehicle;
   a marking-target distance acquisition section which acquires, by the marking information storage section, a marking-target distance between the road marking and each control target which is associated with the road marking detected by the road marking detection section;
   a target-vehicle distance calculation section including a target count determination section configured such that, in a case in which the road divergence determination section has determined that the road diverges ahead, the target count determination section determines whether or not there are a plurality of control targets associated with the road marking detected by the road marking detection section, the target-vehicle distance calculation section being configured such that:
      in a case in which there are a plurality of control targets associated with a road marking, the acquired marking-target distances for each of the associated control targets are compared, an associated control target whose marking-target distance is smaller than the marking target distance for each of the other associated control targets by at least a predetermined distance is selected, and a target-vehicle distance, which is the distance along the road between the vehicle and the selected control target, is calculated; and
   a driving assistance section which assists the user to drive the vehicle based upon the calculation results calculated by the target-vehicle distance calculation section.

2. The driving assistance apparatus according to claim 1, wherein,
   before the vehicle passes through the divergence in the road, the driving assistance section assists the user to drive the vehicle based upon the calculation results calculated by the target-vehicle distance calculation section with respect to the control target positioned at the shortest marking-target distance between the road marking and the control target, and
   after the vehicle passes through the divergence in the road, the driving assistance section assists the user to drive the vehicle based upon the calculation results calculated by the target-vehicle distance calculation section with respect to the control target formed on the branch road which the vehicle has entered.

3. The driving assistance apparatus according to claim 1, further comprising:
   a subsequent route road determination section configured such that, in a case in which the road divergence determination section has determined that the current road diverges ahead, the subsequent route road determination section determines whether or not there is a branch road that has a subsequent route road relation with the current road, wherein, in a case in which the subsequent route road determination section has determined that there is a branch road having a subsequent route road relation with the current road on which the vehicle is traveling, the driving assistance section assists the user to drive the vehicle based upon the calculation results calculated by the target-vehicle distance calculation section with respect to the control target formed on the branch road for which it has been thus determined that a subsequent route road relation exists with respect to the current road.

4. The driving assistance apparatus according to claim 1, further comprising:

a guided route setting section which sets a guided route which is a target route for the driving guidance; and a guided route determination section configured such that, in a case in which the road divergence determination section has determined that the current road diverges ahead, the guided route determination section determines whether or not there is a branch road that has been set to be the guided route, wherein, in a case in which the guided route determination section has determined that there is a branch road that has been set to be the guided route, the driving assistance section assists the user to drive the vehicle based upon the calculation results calculated by the target-vehicle distance calculation section with respect to the control target formed on the branch road which has been thus determined to have been set to be the guided route.

5. The driving assistance apparatus according to claim 1, further comprising a vehicle control section which controls the vehicle, wherein the driving assistance section controls the vehicle by means of the vehicle control section based upon the target-vehicle distance between the vehicle and the associated control target.

6. The driving assistance apparatus according to claim 1, further comprising a traveling guidance section which provides traveling guidance to the user, wherein the driving assistance section provides guidance by means of the traveling guidance section based upon the target-vehicle distance between the vehicle and the associated control target.

* * * * *